(12) United States Patent  
Pais et al.

(10) Patent No.: US 10,057,752 B2  
(45) Date of Patent: Aug. 21, 2018

(54) INTERFERENCE AVOIDANCE IN D2D COMMUNICATIONS

(71) Applicants: Koninklijke KPN N.V., The Hague (NL); Nederlandse Organisatie voor Toegepast-Natuurwetenschappelijk Onderzoek TNO, 's-Gravenhage (NL)

(72) Inventors: Adrian Victor Pais, Voorburg (NL); Ljupco Jorguseski, Rijswijk (NL); Jose Luis Almodovar Chico, Delft (NL); Antonius Hendrikus Johannes Norp, The Hague (NL)

(73) Assignees: Koninklijke KPN N.V., The Hague (NL); Nederlandse Organisatie Voor Toegepast-Natuurwetenschappelijk Onderzoek TNON, 'S-Gravenhage (NL)

( * ) Notice: Subject to any disclaimer, the term of this patent is extended or adjusted under 35 U.S.C. 154(b) by 360 days.

(21) Appl. No.: 14/820,868

(22) Filed: Aug. 7, 2015

(65) Prior Publication Data

US 2016/0044486 A1 Feb. 11, 2016

(30) Foreign Application Priority Data

Aug. 8, 2014 (EP) .................... 14180340

(51) Int. Cl.
*H04W 72/08* (2009.01)
*H04W 24/08* (2009.01)
(Continued)

(52) U.S. Cl.
CPC ........... *H04W 8/005* (2013.01); *H04W 24/08* (2013.01); *H04W 52/0209* (2013.01);
(Continued)

(58) Field of Classification Search
None
See application file for complete search history.

(56) References Cited

U.S. PATENT DOCUMENTS 8,849,203 B2* 9/2014 Cakulev ............ H04W 76/023
455/41.2
8,953,531 B2* 2/2015 Oh ...................... H04W 72/085
370/329
(Continued)

FOREIGN PATENT DOCUMENTS

WO WO 2010/097645 A1 9/2010
WO WO 2010097645 A1 * 9/2010 .......... H04W 72/048
(Continued)

OTHER PUBLICATIONS

"3rd Generation Partnership Project; Technical Specification Group Services and System Aspects; General Packet Radio Service (GPRS) Enhancements for Evolved Universal Terrestrial Radio Access Network (E-UTRAN) Access (Release 12)", 3GPP TS 23.401, v12.5.0, Jun. 2014, pp. 1-305.
(Continued)

*Primary Examiner* — Ayaz R Sheikh
*Assistant Examiner* — Tarell A Hampton
(74) *Attorney, Agent, or Firm* — McDonnell Boehnen Hulbert & Berghoff LLP

(57) ABSTRACT

A method for allocating radio resources for a D2D communication between a first device and a second device is disclosed. The method includes identifying device(s) relevant for the D2D communication between the first and second devices, obtaining location information for the identified device(s), determining a value of a distance parameter for each of the identified devices using the location information obtained for the device and one or both of location information for the first device and location information for the second device, and allocating one or more radio
(Continued)

resources for the D2D communication between the first device and the second device based on the determined value of the distance parameter.

23 Claims, 9 Drawing Sheets

(51) Int. Cl.
  *H04W 52/02* (2009.01)
  *H04W 24/02* (2009.01)
  *H04W 8/00* (2009.01)
(52) U.S. Cl.
  CPC .......... *H04W 72/082* (2013.01); *H04W 24/02* (2013.01); *Y02D 70/00* (2018.01); *Y02D 70/1222* (2018.01); *Y02D 70/1224* (2018.01); *Y02D 70/1242* (2018.01); *Y02D 70/1262* (2018.01); *Y02D 70/142* (2018.01); *Y02D 70/146* (2018.01); *Y02D 70/164* (2018.01); *Y02D 70/21* (2018.01)

(56) References Cited

U.S. PATENT DOCUMENTS

| | | | |
|---|---|---|---|
| 2007/0060065 A1* | 3/2007 | Kruys | G01S 7/021 455/67.11 |
| 2007/0133491 A1* | 6/2007 | Ushiki | H04W 88/06 370/338 |
| 2008/0280625 A1 | 11/2008 | Larsen | |
| 2009/0016295 A1* | 1/2009 | Li | H04L 5/0007 370/330 |
| 2010/0167719 A1* | 7/2010 | Sun | H04W 36/0088 455/423 |
| 2011/0244899 A1* | 10/2011 | Li | H04W 76/023 455/501 |
| 2012/0208578 A1* | 8/2012 | Jeong | H04W 52/0212 455/501 |
| 2012/0257519 A1* | 10/2012 | Frank | H04L 5/0035 370/252 |
| 2013/0272196 A1* | 10/2013 | Li | H04W 72/044 370/328 |
| 2014/0141789 A1* | 5/2014 | Tarokh | H04W 72/02 455/450 |
| 2014/0314049 A1* | 10/2014 | Cho | H04L 5/006 370/332 |
| 2015/0223111 A1* | 8/2015 | Lindoff | H04W 24/02 370/252 |
| 2015/0230257 A1* | 8/2015 | Hagerman | H04W 76/023 455/456.5 |
| 2015/0264695 A1* | 9/2015 | Kim | H04W 72/082 455/452.1 |
| 2015/0351044 A1* | 12/2015 | Boudreau | H04W 72/0473 370/329 |
| 2017/0105240 A1* | 4/2017 | Chen | H04W 76/023 |
| 2017/0230919 A1* | 8/2017 | Siomina | H04W 52/383 |

FOREIGN PATENT DOCUMENTS

| | | | | |
|---|---|---|---|---|
| WO | WO 2011/050519 A1 | 5/2011 | | |
| WO | WO 2011050519 A1 * | 5/2011 | .......... | H04W 72/042 |
| WO | WO 2013171161 A1 * | 11/2013 | .......... | H04W 76/023 |
| WO | WO 2014/066325 A2 | 5/2014 | | |
| WO | WO 2014/066325 A3 | 5/2014 | | |

OTHER PUBLICATIONS

"3rd Generation Partnership Project; Technical Specification Group Radio Access Network; Evolved Universal Terrestrial Radio Access (E-UTRA); Physical Channels and Modulation (Release 12)", 3GPP TS 36.211, v12.2.0, Jun. 2014, pp. 1-121.

"3rd Generation Partnership Project: Technical Specification Group Services and System Aspects; Network Architecture Release 10", 3GPP TS 23.002, V10.2.0, Mar. 2011, pp. 1-93.

Search Report and Written Opinion issued in connection with EP Application No. 14180340.3, European Patent Office, dated Feb. 23, 2015 (10 pages).

* cited by examiner

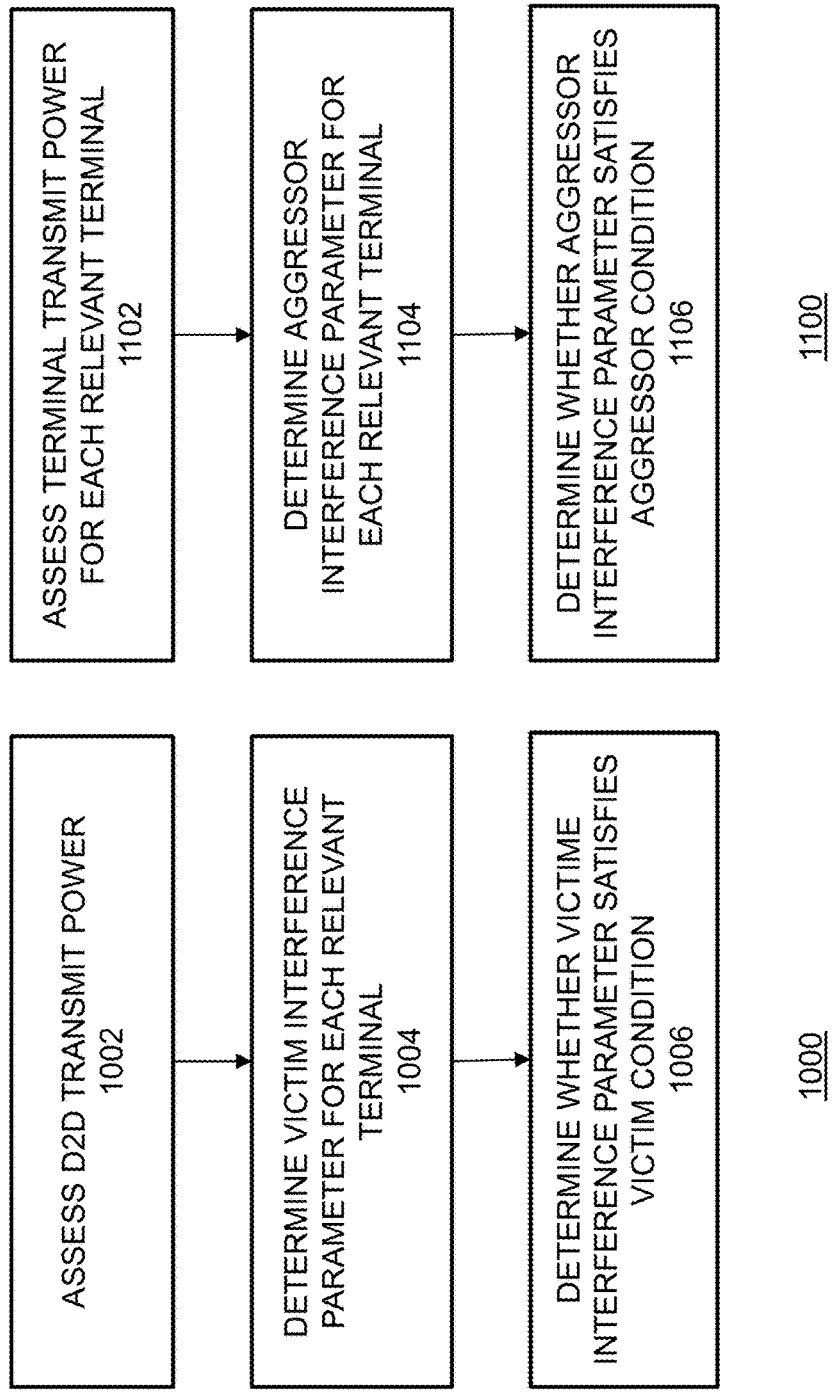

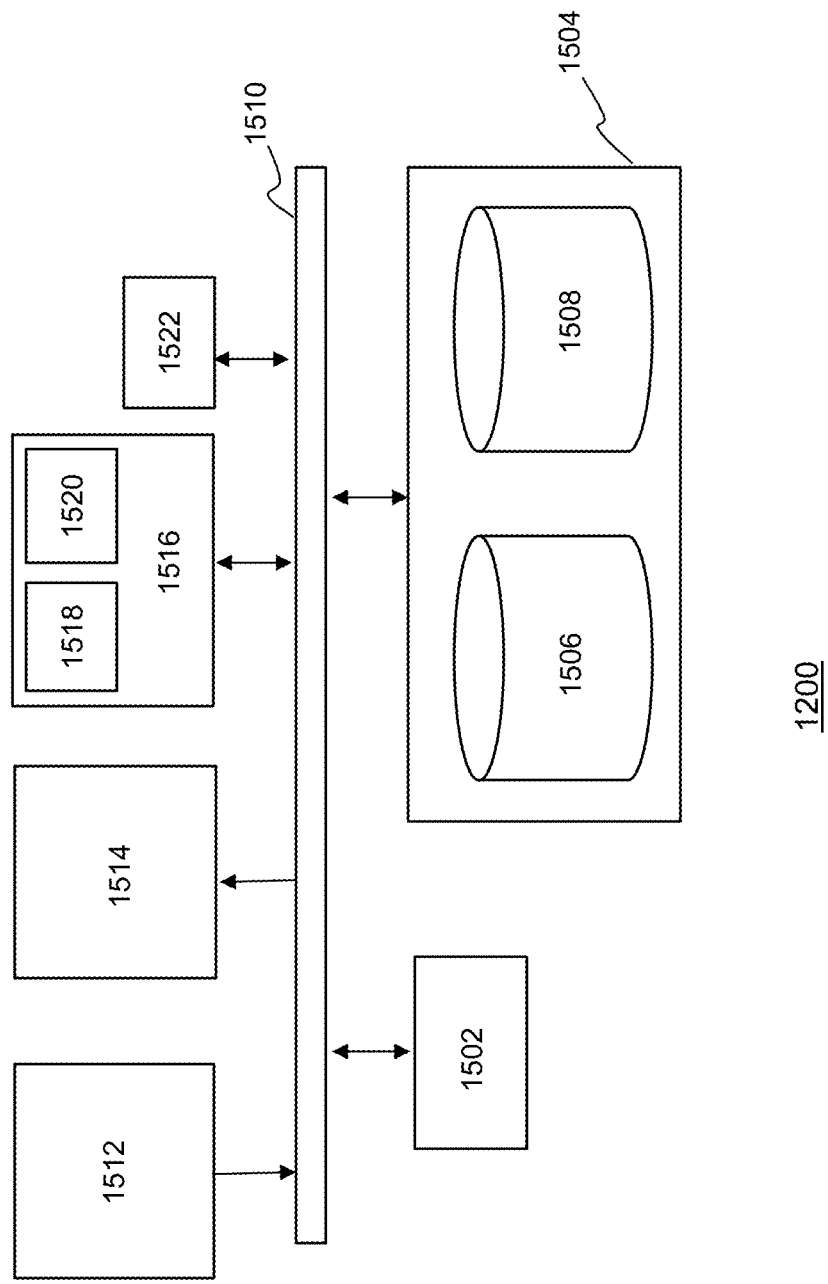

INTERFERENCE AVOIDANCE IN D2D COMMUNICATIONS

CROSS-REFERENCE TO RELATED APPLICATIONS

This application claims priority to European Patent Application No. 14180340.3 filed on Aug. 8, 2014, the contents of which are hereby incorporated by reference in their entirety.

FIELD OF INVENTION

The disclosure generally relates to the field of telecommunications networks. In particular, though not necessarily, the disclosure relates to methods, systems, and computer program products for allocating radio resources for a device-to-device (D2D) communication between a first D2D device and a second D2D device.

BACKGROUND

Radio resource allocation is required in D2D communications both for discovery and communication purposes. In order to be able to establish and maintain reliable D2D communications, radio resources, e.g. in terms of physical resource blocks (PRBs) assigned to the devices participating in the communication, must be allocated taking into account possible surrounding interferences.

For example, in 4G, an evolved nodeB (sometimes abbreviated as "eNodeB" or "eNB") is responsible for all of the communications in a cell and, therefore, is in charge of the radio resource allocation within the cell. Typically it can be assumed that an eNB can distribute the uplink (UL) resources within a cell in non-overlapping manner. In other words, the eNB can distribute the resources in such a manner that there is no risk of interference between D2D and conventional cellular UL transmissions as well as between different D2D transmissions within that cell.

However, D2D communications between the devices of a particular eNB may still experience interference caused by devices, including pairs or groups of devices, engaged in radio communications covered by different eNBs or by devices not covered by any eNBs. Thus, interferences to a pair of devices in a D2D communication can originate from other devices engaged in radio communications, irrespective of whether or not they are within the coverage of, and/or attached to, the telecommunications network.

What is needed in the art is a technique for allocating radio resources that can improve or eliminate at least some of these drawbacks.

SUMMARY

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

To reduce or eliminate at least some of the problems discussed above, according to one aspect of an embodiment of the present invention, a computer-implemented method for allocating radio resources for a D2D communication between a first D2D device ($UE_1$) and a second D2D device ($UE_2$) is disclosed. The method includes identifying one or more devices relevant for the D2D communication between the first D2D device and the second D2D device, in particular devices that do not belong to or are not served by the same cell as the one serving the first and second D2D devices when the D2D communication is requested, and obtaining location information for each device of the identified devices. The method further includes determining a value of a distance parameter for each of the identified devices. The value of the distance parameter is calculated using the location information obtained for the device and one or both of location information for the first D2D device and location information for the second D2D device. Such a distance parameter is a parameter indicative of a distance between one of the device, a device pair comprising the device and a further entity or a further device with which the device is in communication, or a group of further devices comprising the device and a plurality of further entities or further devices with which the relevant device is in communication, and one of the first D2D device, the second D2D device, or a device pair comprising the first D2D device and the second D2D device. The method further includes allocating one or more radio resources for the D2D communication between the first D2D device and the second D2D device based on the distance parameters determined for at least some of the devices identified as relevant.

As used herein, the term "radio resource" is used to describe the spectrum (i.e. time/frequency resources) utilized for communication between the devices. Because there are limited radio resources available it is important to use them as efficiently as possible.

As used herein, the term "D2D device" is used to describe any device or a terminal, preferably a mobile terminal, in standardization more formally known as "User Equipment" (UE) and sometimes also referred to simply as a "user" or a "terminal", capable of D2D communication with another such device. Whereas conventional devices utilize mobile network infrastructure to communicate with each other (i.e. by connecting to a base station), a characteristic of D2D devices is that they can establish direct connections with each other without the need for connection to the base station. In various implementations, such D2D devices may or may not have the capability to connect to the mobile network and establish conventional connections. D2D devices may establish D2D communication with each other upon request from a human user or this may be performed automatically, e.g. according to some pre-defined criteria or policy.

As used herein, the term "D2D communication" is used to describe a direct data connection between two D2D devices utilizing radio resources allocated for that purpose. This communication may be performed independently of whether or not the devices are within mobile network coverage. If one or more of the D2D devices are within coverage, the network may assist in enabling the D2D devices to discover each other, assigning resources for the D2D communication, and monitoring and/or controlling the communication for the purpose of e.g. radio resource and interference management, charging, and billing.

Embodiments of the present invention are based on the insight that identifying devices which may be relevant for the D2D communication between the first and second D2D devices, in particular devices that do not belong to or are not served by the same cell as the one serving the first and second D2D devices when the D2D communication is requested, and obtaining location information for such devices allows calculation of distance to such devices. In turn, determining the distance to such devices (or a derivative of this distance expressed, in general, as a "distance parameter"), allows allocating radio resources for the D2D communication in such a manner that interference caused by the communication of such devices and/or inflicted onto the communication of such devices by the D2D communication between the first and second D2D devices may be reduced or mitigated. In contrast to the current approach where each eNB allocates radio resources based on the situation within a particular cell, embodiments of the present invention allow resource allocation taking into consideration not only potential interference within a particular cell, but also interference that could be caused by communications in other cells ("inter-cell interference") as well as interference that could be caused by communications of devices which are not served by any cell ("out of coverage devices").

In an embodiment, the method may further include assessing D2D transmit power to be used by the first D2D device and/or the second D2D device for the D2D communication between the first D2D device and the second D2D device, and, for each device of the identified devices, determining a victim interference parameter using the determined distance parameter and the assessed D2D transmit power and determining whether the victim interference parameter satisfies a predefined 'potential victim' condition. As used herein, the term "victim interference parameter" is used to describe a parameter indicative of an interference level at the device attributable to the D2D communication between the first D2D device and the second D2D device, and the term "victim" is used to describe devices for which the victim interference parameter satisfies the victim condition because satisfying this condition indicates that the device may be victimized by the interference from the D2D communication between the first and second D2D devices. In such an embodiment, the step of allocating the radio resources could comprise allocating one or more radio resources for the D2D communication based on radio resources allocated to the one or more devices for which the victim interference parameter was determined to satisfy the victim condition, preferably further based on the value of the victim interference parameter.

In an embodiment, the method may further include the following steps, performed for each device of the identified devices: assessing device transmit power used or to be used by the device, determining an aggressor interference parameter using the determined distance parameter and the assessed device transmit power, and determining whether the aggressor interference parameter satisfies a predefined 'potential aggressor' condition. As used herein, the term "aggressor interference parameter" refers to a parameter indicative of an interference level at the first D2D device and/or the second D2D device attributable to the device, and the term "aggressor" is used for devices for which the aggressor interference parameter satisfies the aggressor condition because satisfying this condition indicates that the device may act as an aggressor where the radio communication of the device interferes with the D2D communication between the first and second D2D devices. In such an embodiment, the step of allocating the radio resources would comprise allocating one or more radio resources for the D2D communication between the first D2D device and the second D2D device based on radio resources allocated to the one or more devices for which the aggressor interference parameter was determined to satisfy the aggressor condition, preferably further based on the value of the aggressor interference parameter.

In an embodiment, the method may further include the step of assessing one or more of 1) a D2D transmit power to be used by the first D2D device for the D2D communication between the first D2D device and the second D2D device, 2) a D2D transmit power to be used by the second D2D device for the D2D communication between the first D2D device and the second D2D device, and 3) transmit power used or to be used by each device of the identified devices. In such an embodiment, the step of allocating the radio resources may comprise allocating one or more radio resources for the D2D communication between the first D2D device and the second D2D device based on whether the determined distance parameter satisfies a condition based on the assessed one or more transmit powers.

In an embodiment, the location information for the relevant device may indicate a point representative of a location of the device (e.g. in terms of exact or approximate geographic coordinates, such as e.g. exact or approximate GPS coordinates). In such an embodiment, the distance parameter for the relevant device may be determined as any one of:

1) the minimum or as a weighted average of a geometrical distance between the point representative of the location of the device and a point representative of a location of the first D2D device and a geometrical distance between the point representative of the location of the device and a point representative of a location of the second D2D device;
2) when the device is in communication with a further node, such as e.g. a further device or a base station, the minimum or as a weighted average of a geometrical distance between the point representative of the location of the device and a point representative of a location of the first D2D device, a geometrical distance between the point representative of the location of the device and a point representative of a location of the second D2D device, a geometrical distance between the point representative of the location of the further node and a point representative of a location of the first D2D device, and a geometrical distance between the point representative of the location of the further node and a point representative of a location of the second D2D device; and
3) when the device is in communication with the further node, a distance between a point on a line between the device and the further node and a point on a line between the first D2D device and the second D2D device.

In various embodiments, a location of the point on the line between the device and the further node may be predefined (e.g. the first point is always taken to be in the middle of that line) or determined based on transmit power of the device and/or the further node, sensitivity of the device and/or the further node, or priority of the communication between the device and the further node.

Similarly, in various embodiments, a location of the point on the line between the first D2D device and the second D2D device may be predefined (e.g. the first point is always taken to be in the middle of that line) or determined based on transmit power of the first D2D device and/or the second D2D device, sensitivity of the first D2D device and/or the second D2D device, or priority of the D2D communication between the first D2D device and the second D2D device.

In an embodiment, when the one or more radio resources allocated for the D2D communication between the first D2D device and the second D2D device overlap, in frequency and/or time, with radio resources used by at least one device of the identified devices, the method may further include providing an indication regarding the overlap to the at least one device, preferably with an indication of a power transmit level that the at least one device should apply, and/or providing an indication regarding the overlap to the first D2D device and/or the second D2D device, preferably with an indication of a power transmit level that the first D2D device should apply and an indication of a power transmit level that the second D2D device should apply. Such an embodiment provides the advantage of controlling and, preferably, minimizing levels of interference caused by the communications of devices on each other.

According to another aspect of the present invention, a data processing system and a node (i.e., a device or a network entity such as e.g. a base station) for carrying out method steps as described herein are provided. Each of the data processing system and the node comprise at least a processor configured to carry out method steps described herein. Such a data processing system could be included within the node.

In one embodiment, the node could be an eNB or another node in a telecommunications network serving the first D2D device and the second D2D device. As used herein, the term "serving" in the context of a node serving a device or a pair of devices is used to describe any one, or a combination of, providing radio coverage for the device(s), allocating radio resources for the device(s), performing network switching functionality for the device(s), etc. In one embodiment, such a node could be configured to obtain the location information for each device of the identified relevant devices by receiving the location information as reported by the device or by determining the location information for the device. Similarly, such a node could be configured to obtain the location information for the first and second D2D devices by receiving this location information as reported by these devices or by determining the location information for the first and second D2D devices.

When the node is an eNB or another node in the telecommunications network serving the first D2D device and the second D2D device, in one further embodiment, the step of receiving of the location information as reported by the relevant device (or by the first and/or second D2D devices) may include one of:

1) receiving the location information as reported by the device to a further telecommunications network, preferably the further telecommunications network being configured to operate using radio technology different than that used for the D2D communication between the first D2D device and the second D2D device;
2) receiving the location information as reported by the device to a further eNB within the telecommunications network, the further eNB configured to operate in a different frequency band than that used for the D2D communication between the first D2D device and the second D2D device; and
3) receiving the location information as reported by the device located outside of the coverage of the telecommunications network or the further telecommunications network to a device located inside the coverage of the telecommunications network or the further telecommunications network.

In another embodiment, the node could be the first or the second D2D device. In such an embodiment, the node may further be configured to transmit the location information for the node. In a further embodiment, the node may further be configured to scan, in frequency and/or time, radio resources used by the one or more of the identified relevant devices. Such embodiments may be advantageous when there is no network coverage and no network coordination for the devices involved.

The disclosure may also relate to a computer program, implemented on computer-readable storage medium, and to a computer-readable storage medium, preferably non-transitory, storing such a computer program. The computer program may comprise software code portions configured for, when run on a computer, executing the method steps according to any of the methods described in the present disclosure.

The disclosure will further be illustrated with reference to the attached drawings, which schematically show embodiments according to the disclosure. It will be understood that the disclosure is not in any way restricted to these specific embodiments. Moreover, combinations of any of the embodiments and limitations are envisioned by the disclosure.

BRIEF DESCRIPTION OF THE DRAWINGS

Aspects of the invention will be explained in greater detail by reference to exemplary embodiments shown in the drawings, in which:

FIG. 10 provides a flow diagram of method steps for allocating radio resources for a D2D communication between a first D2D device and a second D2D device based on a victim interference parameter determined for each relevant device, according to one embodiment of the present invention;

FIG. 11 provides a flow diagram of method steps for allocating radio resources for a D2D communication between a first D2D device and a second D2D device based on an aggressor interference parameter determined for each relevant device, according to one embodiment of the present invention; and FIG. 12 shows a block diagram illustrating an exemplary data processing system that may be used to calculate a speech quality indicator, according to one embodiment of the present disclosure.

DETAILED DESCRIPTION

Figure 1:
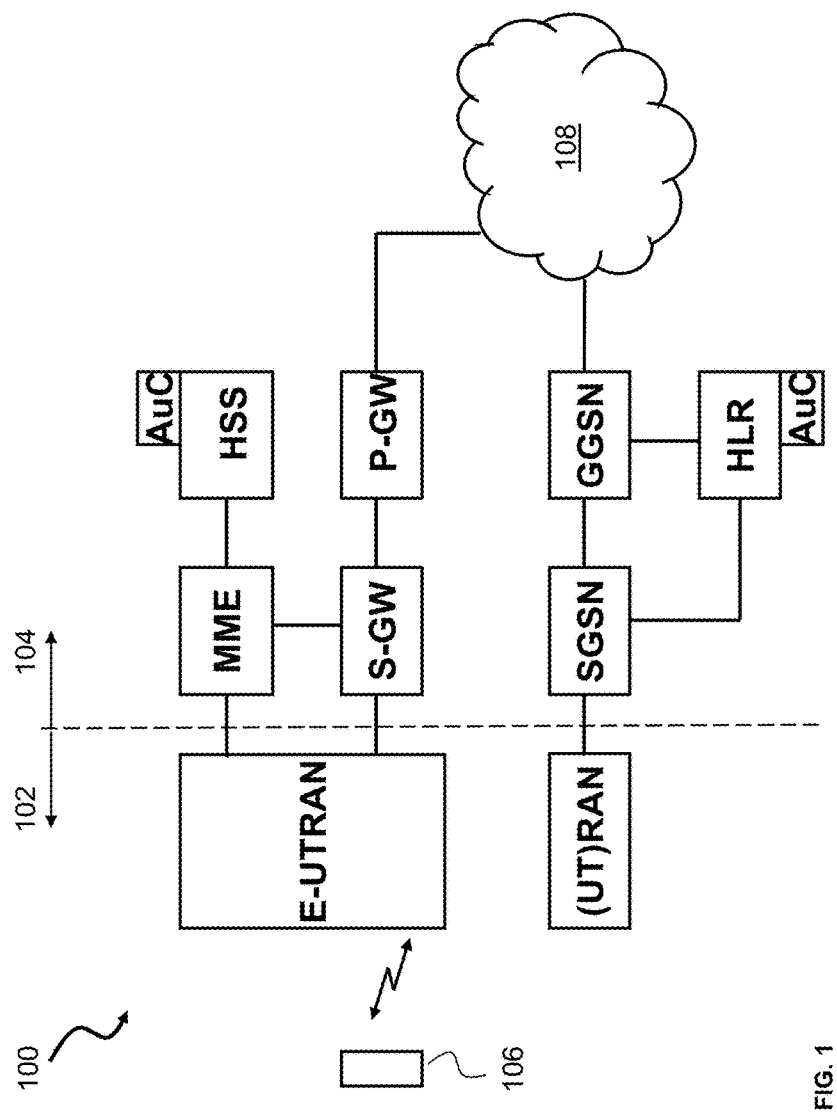
FIG. 1 shows a schematic illustration of a telecommunications system, according to one embodiment of the present invention.

FIG. 1 shows a schematic illustration of a telecommunications system 100. The telecommunications system 100 comprises a radio access network 102 (also indicated as E-UTRAN or RAN in FIG. 1) and a core network 104 containing various elements or nodes as described in further detail below.

In the telecommunications system of FIG. 1, three generations of networks are schematically depicted together for purposes of brevity. A more detailed description of the architecture and overview can be found in 3GPP TS 23.002 which is included in the present application by reference in its entirety.

The lower branch of FIG. 1 represents a GPRS or UMTS telecommunications network.

For a GSM/GPRS telecommunications network (i.e., a 2G/2.5G telecommunications network), a radio access network 102 comprises a plurality of base stations (combination of a BSC and a BTS) and one or more Radio Network Controllers (RNCs), not shown individually in FIG. 1. The core network 104 comprises a Gateway GPRS Support Node (GGSN), a Serving GPRS Support Node (SGSN, for GPRS) or Mobile Switching Centre (MSC, for GSM, not shown in FIG. 1), and a Home Location Register (HLR) combined with an Authentication Centre (AuC). The HLR contains subscription information for mobile devices 106 (sometimes referred to as "user equipment" (UE) or user devices) and the AuC contains a shared secret key K to be used for authentication and key agreement (AKA) procedures.

For a UMTS radio access network (UTRAN) (i.e., a 3G telecommunications network), the radio access network 102 also comprises a Radio Network Controller (RNC) connected to a plurality of NodeBs, also not shown. In the core network 104, the GGSN and the SGSN/MSC are conventionally connected to the HLR/AuC that contains subscription information and shared secret keys K of the mobile devices 106.

It should be noted that the RNC functionality in GSM and UMTS networks is formally part of the RAN. The RNC functionality may be implemented in one or more base stations. Such a configuration is known as a collapsed architecture.

The upper branch in FIG. 1 represents a next generation telecommunications network, commonly indicated as Long Term Evolution (LTE) system or Evolved Packet System (EPS) (i.e., a 4G telecommunications network). In such a network, the radio access network 102, indicated as E-UTRAN, comprises evolved NodeBs (eNodeBs or eNBs) providing wireless access for the mobile devices 106. The core network 104 comprises a PDN Gateway (P-GW) and a Serving Gateway (S-GW). The E-UTRAN of the EPS is connected to the S-GW via a packet network. The S-GW is connected to a Home Subscriber Server HSS and a Mobility Management Entity MME for signalling purposes. The HSS includes a subscription profile repository SPR and is combined with an Authentication Centre (AuC) that stores a shared secret key K for AKA procedures. Further information of the general architecture of a EPS network can be found in 3GPP TS 23.401.

For GPRS, UMTS and LTE telecommunications network, the core network 104 is generally connected to a further packet network 108, e.g. the internet, using e.g. a gateway (e.g the P-GW).

Of course, architectures other than defined by 3GGP, e.g. WiMAX, can also be used within the context of the present disclosure.

Radio resource allocation in the networks illustrated in FIG. 1 is typically done by base station(s) in a GSM/GPRS telecommunications network, nodeB(s) in a UMTS telecommunications network, and eNB(s) in an LTE telecommunications network. As used herein, the expression "radio resource allocation" refers to a network level control of channel interference and other radio transmission characteristics in wireless communications systems. Radio resource allocation includes techniques for controlling parameters such as transmission frequency, transmit power and transmission bandwidth, with the objective of utilizing the limited radio frequency spectrum resources and radio network infrastructures as efficiently as possible. Some examples of techniques that may be used to maximise spectrum resource utilisation are dynamic resource allocation, inter-cell interference coordination and load balancing.

A physical resource block (PRB) is the smallest unit of resource that can be allocated, scheduled and transmitted in LTE. A PRB consists of seven consecutive OFDM symbols in the time domain (occupying a 0.5 ms time slot) and 12 consecutive subcarriers in the frequency domain (occupying a total of 180 kHz), meaning that there are 84 OFDM symbol/carrier combinations, known as "resource elements", in each PRB. The number of available PRBs depends on the channel bandwidth available for transmission and, for single carrier transmission, this varies from 6 PRBs (1.25 MHz bandwidth) to 100 PRBs (20 MHz bandwidth). Further information regarding PRBs may be found in the 3GPP specification TS 36.211.

D2D communication, typically defined as a direct communication between two mobile devices without traversing the base station, nodeB, or eNB of the radio access network and without traversing the core network, appears to be a promising component in the next generation cellular technologies. D2D communication can take place when the communicating devices are in range for D2D communication. Such communication can occur either on the cellular radio spectrum (i.e., inband) or on the unlicensed spectrum (i.e., outband).

In the present disclosure, embodiments of the present invention are described with reference to 4G telecommunications network. However, these embodiments are equally applicable to 2G, 3G and 5G, as well as to telecommunications networks other than those defined by 3GGP, supporting D2D communication.

FIGS. 2-7 provide schematic illustrations of interference problems that the inventors of the present application identified as having the potential to adversely affect D2D communications between devices. In FIGS. 2-7, unwanted/unintended interferences are illustrated with dashed arrows, while desired/intended connections are illustrated with solid arrows, and coverage of a cell/eNB is schematically illustrated as a dotted oval surrounding the eNB.

Figure 2:
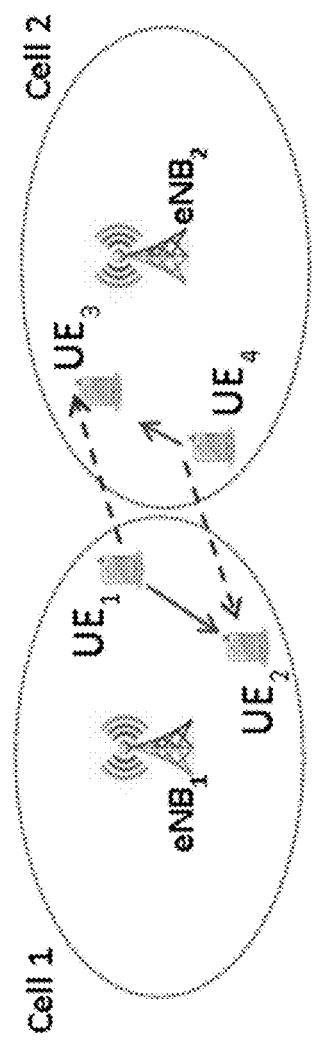
FIG. 2 provides a schematic illustration of a general case of inter-cell interference, according to one embodiment of the present invention.

Even though D2D communications, by definition, do not traverse eNB, currently radio resource allocation for D2D communications is performed by eNBs. As previously described herein, in D2D communications, radio resource allocation is required both for discovery (i.e., the process of two D2D devices discovering each other) and communication (i.e., the process of two D2D devices exchanging data with one another) purposes. In general, regardless of whether the radio resource allocation being for discovery or for communication, or how exactly the resource allocation takes place (i.e. UE specific or non UE specific), a problem may arise when two different eNBs (eNB1 and eNB2) happen to allocate the same radio resources for D2D communications near the cell edge as this may create significant interference originated from devices that are located close to each other. This situation is shown in FIG. 2, providing a schematic illustration of a general case of inter-cell interference. FIG. 2 illustrates one pair of D2D devices (shown as devices $UE_1$ and $UE_2$) belonging to one cell (shown as Cell 1 covered by $eNB_1$), and another pair of D2D devices (shown as devices $UE_3$ and $UE_4$) belonging to another cell (shown as Cell 2 covered by $eNB_2$). Interferences may occur when the devices $UE_1$ and $UE_2$ are assigned frequencies that overlap with frequencies used by the devices $UE_3$ and $UE_4$.

Figure 3:
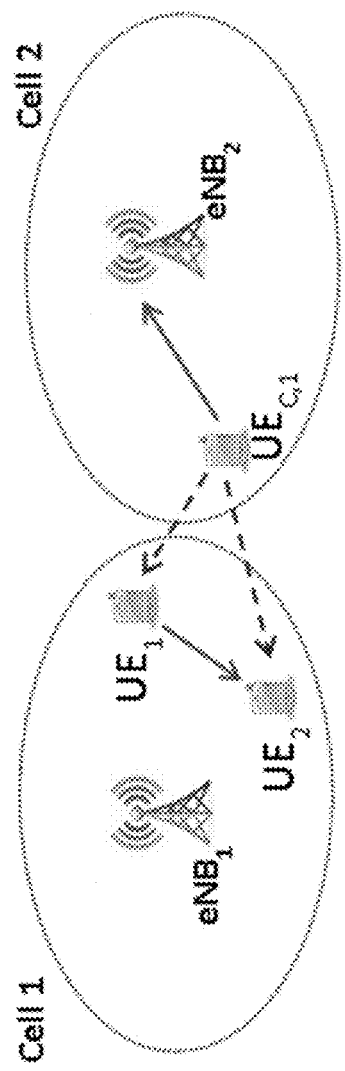
FIG. 3 provides a schematic illustration of inter-cell interference caused by a device in a communication session that is not D2D, according to one embodiment of the present invention.

In addition to interferences arising from D2D communications in other cells, D2D communications may also be affected by interferences arising from conventional users, i.e. from devices not capable of or not participating in D2D communications, belonging to other cells. FIG. 3 provides a schematic illustration of D2D devices $UE_1$ and $UE_2$ belonging to one cell (shown as Cell 1 covered by $eNB_1$) maintaining a D2D communication which suffers interferences coming from a close-by device (shown as a device $UE_{C,1}$) belonging to another cell (shown as Cell 2 covered by $eNB_2$). In this case, $UE_{C,1}$ may be a conventional device without D2D capabilities having a connection, e.g. a data or a voice connection, through $eNB_2$, as shown with the solid arrow between $UE_{C,1}$ and $eNB_2$.

While FIGS. 2 and 3 depict two devices $UE_1$ and $UE_2$ in the D2D communication which may be affected by unwanted and unintended interferences, analogous reasoning applies to any cluster of devices maintaining D2D communications.

Figure 4:
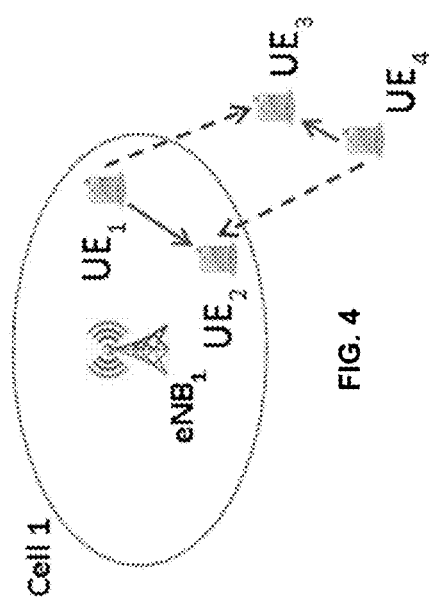
FIG. 4 provides a schematic illustration of interference caused by a D2D session of devices that are not attached to any cell, according to one embodiment of the present invention.

Furthermore, until now, all the cases presented were based on interferences coming from surrounding cells, but interferences can also be created by devices which are not attached to a cell, i.e. by out-of-coverage UEs. FIG. 4 presents a case where two D2D capable devices (shown as devices $UE_3$ and $UE_4$), which are not attached to any cell but are close to the edge of Cell 1 and are in a D2D communication between each other, as shown with a solid arrow between $UE_3$ and $UE_4$, are producing interferences to the D2D communication between two devices (shown as devices $UE_1$ and $UE_2$) belonging to the Cell 1 covered by $eNB_1$.

While FIG. 4 depicts two devices $UE_3$ and $UE_4$ producing interferences that may disturb the D2D communication between two devices $UE_1$ and $UE_2$, analogous reasoning applies to any cluster of devices maintaining D2D communications and/or any other single devices disturbing the D2D communication between devices $UE_1$ and $UE_2$.

Figure 5:
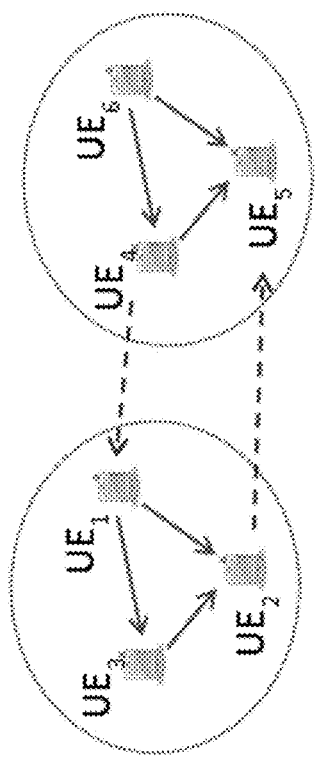
FIG. 5 provides a schematic illustration of interference between two clusters of D2D devices not attached to any cell, according to one embodiment of the present invention.

FIGS. 2-4 all illustrate interferences where devices belonging to a cell are affected. However, a situation is possible where D2D communications among devices that are not attached to any cell but belong to one cluster of two or more devices can present interferences to D2D communications among devices of another cluster of two or more devices. FIG. 5 illustrates interferences between the devices of a first cluster, comprising devices shown as $UE_1$, $UE_2$, and $UE_3$, and the devices of a second cluster, comprising devices shown as $UE_4$, $UE_5$, and $UE_6$. As shown in FIG. 5, the D2D communication between devices $UE_1$ and $UE_2$ of one cluster could be affected by the D2D communication between devices $UE_4$ and $UE_5$ of the other cluster, when these pairs of devices are sufficiently close to one another.

An important characteristic of UEs is that they are mobile equipment. A user of a UE is not expected to keep standing in one place while e.g. having a conversation using the UE. Therefore, users should not be expected to remain in the same spot while having a D2D communication. This mobility of D2D devices introduces further cases of interferences that should be addressed.

Figure 6:
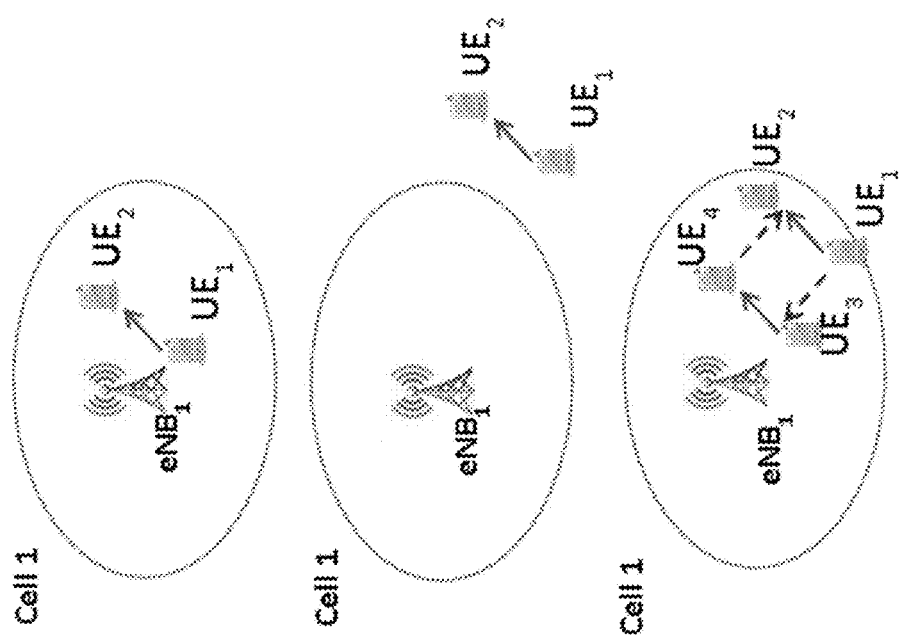
FIG. 6 provides a schematic illustration of interference resulting from a pair of D2D devices going out of the radio coverage range of a cell and later coming back to the range, according to one embodiment of the present invention.

Once again, it can be assumed that the eNB will take care of reassigning radio resources to avoid interferences if the D2D devices move within a single cell. However, interference may arise if two D2D devices having a D2D communication go out from their cell and then come back, as depicted in FIG. 6. In the example of FIG. 6, as shown with the upper-most illustration of Cell 1, devices $UE_1$ and $UE_2$ are maintaining a D2D communication using radio resources assigned by eNB by which these devices were covered when the D2D communication was requested. At that point, devices $UE_1$ and $UE_2$ are within the coverage of $eNB_1$. While maintaining this communication, the devices $UE_1$ and $UE_2$ exit the radio range of Cell 1, as shown with the middle illustration of Cell 1 in FIG. 6. When the devices $UE_1$ and $UE_2$ return back to Cell 1, their radio resources have been assigned to devices $UE_3$ and $UE_4$, and, consequently, there is an overlap between D2D active communications of these two pairs of devices, as shown with the lower-most illustration of Cell 1 in FIG. 6.

Figure 7:
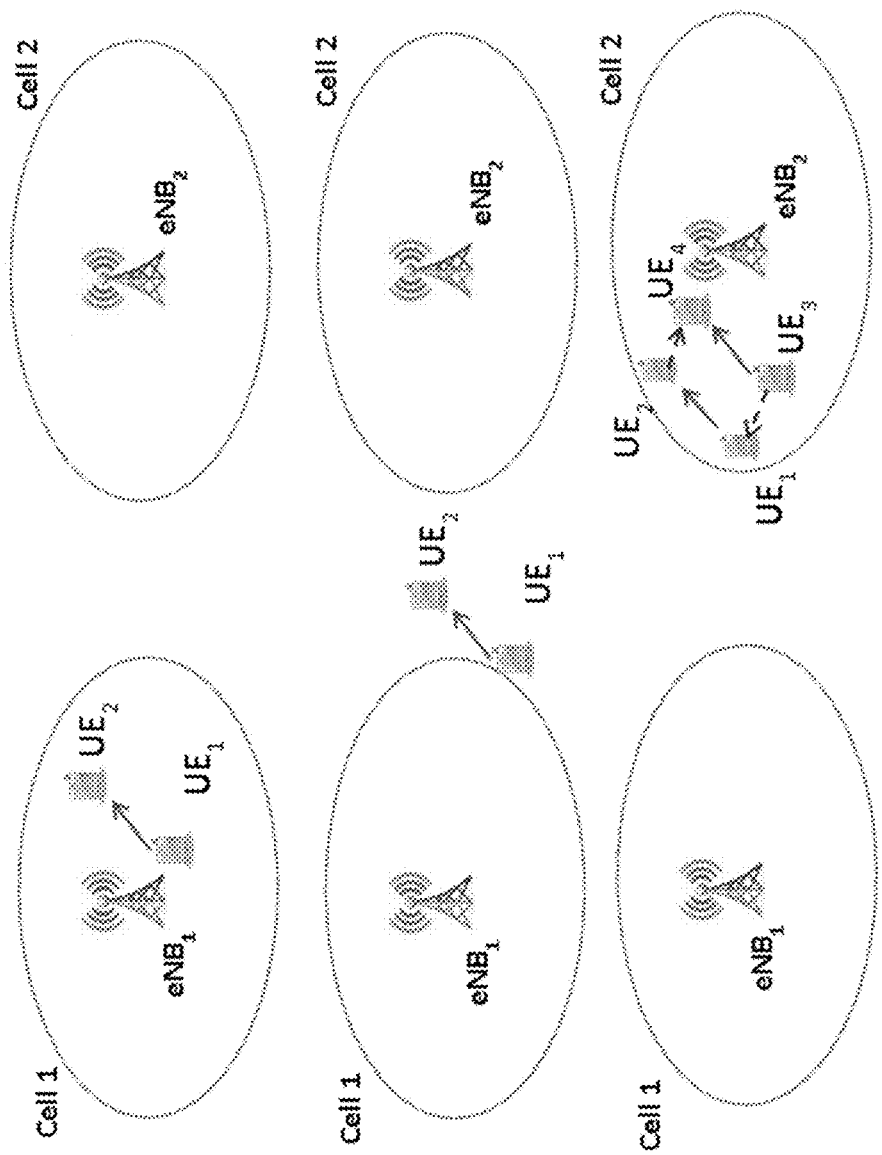
FIG. 7 provides a schematic illustration of interference resulting from a handover of D2D devices between two cells; according to one embodiment of the present invention.

Another example of interferences is shown in FIG. 7, where the devices $UE_1$ and $UE_2$ as described in association with FIG. 6, having a D2D communication that started in Cell 1 served by $eNB_1$ (as shown with the upper-most illustration of Cell 1 in FIG. 7), may travel out of reach of Cell 1 (shown with the middle illustration of Cell 1 in FIG. 7), but then not return to the same cell but, instead, get into the radio range of another cell (Cell 2), as shown in the lower-most illustration in FIG. 7. Thus, FIG. 7 represents a handover between cells. In this case, after the handover to Cell 2, the D2D devices $UE_1$ and $UE_2$ may happen to use radio resources that overlap with the resources used by the D2D devices $UE_3$ and $UE_4$, thus causing interference.

Figure 8:
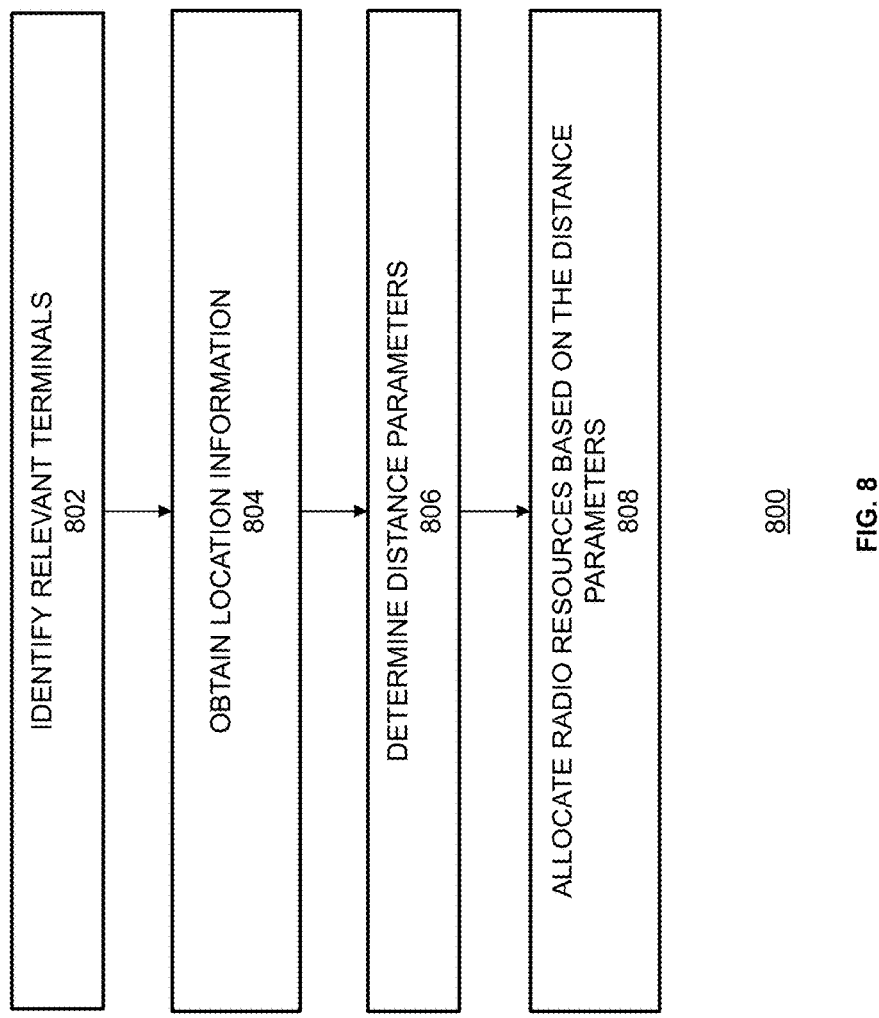
FIG. 8 provides a flow diagram of method steps for allocating radio resources for a D2D communication between a first D2D device and a second D2D device, according to one embodiment of the present invention.

FIG. 8 provides a flow diagram 800 of method steps for allocating radio resources for a D2D communication between a first D2D device and a second D2D device, according to one embodiment of the present invention. The method steps 800 are applicable to a D2D communication where the first D2D device is a device such as e.g. $UE_1$ illustrated in FIGS. 2-7 and the second D2D device is a device such as e.g. $UE_2$ illustrated in FIGS. 2-7. Therefore, the method steps 800 are described by reference to devices $UE_1$ and $UE_2$. However, the discussions provided herein are applicable to any first and second D2D devices and are not limited to devices $UE_1$ and $UE_2$ as depicted in FIGS. 2-7.

The method steps 800 are to be performed by any kind of a data processing system that includes at least a processor configured to carry out the method steps 800. An example of such a data processing system is illustrated in FIG. 12 and a discussion of how such a data processing system could be implemented is provided after the description of FIG. 12.

The method 800 may begin in response to a trigger received by a processor of a data processing system configured to carry out the method 800. In one embodiment, such a trigger could be in a form of the processor receiving an indication that D2D communication between the first and second D2D devices $UE_1$ and $UE_2$ has been requested. In another embodiment, such a trigger could be in a form of the processor receiving information and/or signaling indicating that the first and second D2D devices $UE_1$ and $UE_2$ are within sufficient proximity of each other for D2D communication, e.g. location/tracking area update information. Such an embodiment would advantageously allow resources to be reserved/allocated ahead of time (i.e. before D2D communication has even been requested.

In an embodiment, the method 800 may begin with step 802, where the processor identifies one or more devices relevant for the D2D communication between devices $UE_1$ and $UE_2$. As used herein, "relevant" refers to whether or not a device may present a potential interference problem to the D2D communication between devices $UE_1$ and $UE_2$. An interference problem could, on one hand, be that the D2D communication between devices $UE_1$ and $UE_2$ is negatively affected by such a "relevant device", more precisely—affected by radio communication of such a "relevant device" with some other device or entity, in which case the device is referred to herein as an "aggressor". On the other hand, an interference problem could be that the D2D communication between devices $UE_1$ and $UE_2$ negatively affects such a "relevant device", more precisely—affects a radio communication of such a "relevant device" with some other device or entity, in which case the device is referred to herein as a "victim". It is also possible that a relevant device is both an aggressor and a victim at the same time, or that a relevant device that is e.g. identified as an aggressor at one time may become a victim at another time.

In various embodiments, devices may be identified as "relevant" to the D2D communication between devices $UE_1$ and $UE_2$ based on different criteria or a mix of these criteria. For example, a device may be identified as "relevant" when the device is served by a cell that is the same as, overlapping with, neighboring to, or within a certain distance from a cell serving the first D2D device and/or a cell serving the second D2D device when the D2D communication between the first D2D device and the second D2D device is requested. In another example, a device may be identified as "relevant" when the device uses or is configured to use the same type of a radio resource as the one requested for the D2D communication between the first D2D device and the second D2D device.

In yet other examples, a device may be identified as "relevant" when the device uses or is configured to use frequencies within a frequency band at least partially overlapping with a frequency band requested for the D2D communication between the first D2D device and the second D2D device, and/or when the device uses or is configured to use radio resources within a time period at least partially overlapping with the time period for which the D2D communication between the first D2D device and the second D2D device is requested.

It is also possible and is within the scope of the present invention, that all devices are identified as "relevant" not on a device-by-device basis, but as a group. For example all of the devices known to the processor, or a particular sub-group of such devices, may be identified as "relevant" by default. Such identification may be e.g. pre-programmed within the data processing system carrying out the method 800 or provided from an external source at a later time. An example of a particular sub-group of devices which could be identified as "relevant" by default could include devices that have requested group D2D communications with each other in the past and/or are known to frequently have group-based communications with each other using D2D, which can e.g. be ascertained using historical, subscription, or "friends list" information available from the network.

In step 804, the processor obtains location information for each relevant device. The location information indicates a location of a device, e.g. it may indicate a point representative of a location of a device, e.g. in terms of exact or approximate geographic coordinates, such as e.g. exact or approximate GPS coordinates.

In general, as is known in the art, location of a device such as any one of the relevant devices or the D2D devices can be expressed as a point or as an area. Expressing the location as an area may represent an uncertainty in the exact location of a device (e.g. there is a 95% chance that the device is located within the area). Expressing the location as a point may reflect any one of, or a combination of, the most likely location, a weighted average, a central location representing the area within which the device is known to be, or a measured geographic location (e.g. measured using GPS).

Whether the location information for a device includes exact or only approximate geographic coordinates of a device and the manner in which the processor obtains location information for a device depends on a particular deployment scenario for implementing the methods described herein. Below, four different implementation scenarios are described. The first scenario covers a situation where all devices (i.e. the first and second D2D devices as well as all relevant devices) are within network coverage. The second scenario covers a situation where some of the devices may be outside of network coverage. The third scenario covers a situation where all devices are outside of network coverage but are under network coordination. Finally, the fourth scenario covers a situation where all devices are outside of network coverage and there is no network coordination.

For example, when the data processing system carrying out the method 800 is included within a node in a telecommunications network serving the first D2D device and the second D2D device, such as e.g. an eNB or another node, the processor may be configured to obtain location information for a relevant device by receiving this information as reported by the device and/or by determining the location information for the device. Further, and more detailed, description of how step 804 may be implemented is provided in the descriptions of the four different implementation scenarios below. This also holds for other method steps illustrated in FIG. 8 as well as method steps illustrated in FIGS. 10 and 11.

In addition to obtaining location information for the relevant devices in step 804, the processor is also configured to obtain location information for the first and second D2D devices (not shown in FIG. 8). Again, depending on a particular implementation scenario, this information may also comprise either exact or approximate geographic coordinates (i.e. be expressed as a point or as an area), and be e.g. received by the processor as reported by these devices or obtained by the processor doing the determination of the location of these devices.

Once the location information has been obtained, the method may proceed to step 806, where the processor proceeds to determine, for each of the relevant devices, the value of a distance parameter indicative of a distance between one of the relevant device, a device pair comprising the relevant device and a further entity or a device with which the relevant device is in communication, or a group of devices comprising the relevant device and several further entities or devices with which the relevant device is in communication, and one of the first D2D device, the second D2D device, or a device pair comprising the first D2D device and the second D2D device. Thus, in various embodiments, the distance parameter could be indicative of one or more of, or any combination of:

1) a distance between the relevant device and the first D2D device (i.e. a distance between two single devices),
2) a distance between the relevant device and the second D2D device (i.e. also a distance between two single devices),
3) a distance between the relevant device and a device pair comprising the first D2D device and the second D2D device (i.e. a distance between a single device and a device pair),
4) a distance between a device pair comprising the relevant device and a further entity or a device with which the relevant device is in communication with, and the first D2D device (i.e. a distance between a single device and a device pair),
5) a distance between a device pair comprising the relevant device and a further entity or a device with which the relevant device is in communication with and the second D2D device (i.e. a distance between a single device and a device pair), 6) a distance between a device pair comprising the relevant device and a further entity or a device with which the relevant device is in communication with and a device pair comprising the first D2D device and the second D2D device (i.e., a distance between two device pairs), and 7) a distance between a group of devices comprising the relevant device and several further entities or devices with which the relevant device is in communication with and the first D2D device (i.e. a distance between a single device and a group of devices), 8) a distance between a group of devices comprising the relevant device and several further entities or devices with which the relevant device is in communication with and the second D2D device (i.e. a distance between a single device and a group of devices), 9) a distance between a group of devices comprising the relevant device and several further entities or devices with which the relevant device is in communication with and a device pair comprising the first D2D device and the second D2D device (i.e., a distance between a group of devices and a device pair).

A person skilled in the art will recognize that there are many ways to define such a distance parameter and many ways of how to calculate it. While some exemplary embodiments of determining the distance parameters are described herein, modifications are possible and are within the scope of the present invention, as long as the resulting distance parameter provides a value indicative of one or more of the distances described herein.

In a first exemplary embodiment, determination of the distance parameter may be based on the location of single devices. The distance parameter may then be determined e.g. as the minimum distance between a point or an area representing the location of a relevant device and a point or an area representing the location of one of the D2D devices. Alternatively or additionally, if the relevant device is communicating with a further node, then the distance parameter may be determined as the minimum distance between a point or an area representing the location of the further node and a point or an area representing the location of one of the D2D devices.

In a second exemplary embodiment, the distance parameter may be determined as the minimum or a weighted average of any of the distances calculated in the first exemplary embodiment.

In a third exemplary embodiment, determination of the distance parameter may be based on the location of at least one pair of devices, e.g. location of a pair of the D2D devices and/or location of a pair of a relevant device communicating with a further node. In such an embodiment, the location of a device pair could also be expressed as a point or an area. Definition of the location as an area may represent an uncertainty in the exact location of the pair of the devices (e.g. there is a 95% chance that the pair of D2D devices or the pair of the relevant device and the further node is located within the area). Definition of the location as a point may reflect a weighted average of the possible locations of both devices, a central location representing the area within which the pair of devices is known to be, a point on a line between a point representing the location of the first D2D device and a point representing the location of the second D2D device, or a point on a line between a point representing the location of the relevant device and a point representing the location of the further node. In various embodiments, the location of the point on the line may be predefined (e.g. the middle of the line) or may reflect transmit power of either one or both devices of a device pair, priority of either one or both devices of a device pair, and/or sensitivity of either one or both devices of a device pair. In one such an embodiment, the distance parameter may be calculated e.g. as the minimum distance between the point or the area representing the pair of D2D devices and the relevant device, or in case the relevant device is communicating with a further node as the minimum distance between the point or area representing the pair of D2D devices and the further node. In another such an embodiment, the distance parameter may be calculated as the minimum distance between the point or area representing the pair of D2D devices and the pair of the relevant device and the further node.

In various embodiments, the weights used in the calculation of the weighted averages described herein could be selected based on, for example, transmit power of the first D2D device and/or the second D2D device, sensitivity of the first D2D device and/or the second D2D device, priority of the D2D communication between the first D2D device and the second D2D device, transmit power of the relevant device and/or the further node, sensitivity of the relevant device and/or the further node, or priority of the communication between the relevant device and the further node. In an embodiment, a weighted average could include compensation for blocking structures (e.g. buildings) that are known to be in the path between the locations of the D2D devices.

Figure 9:
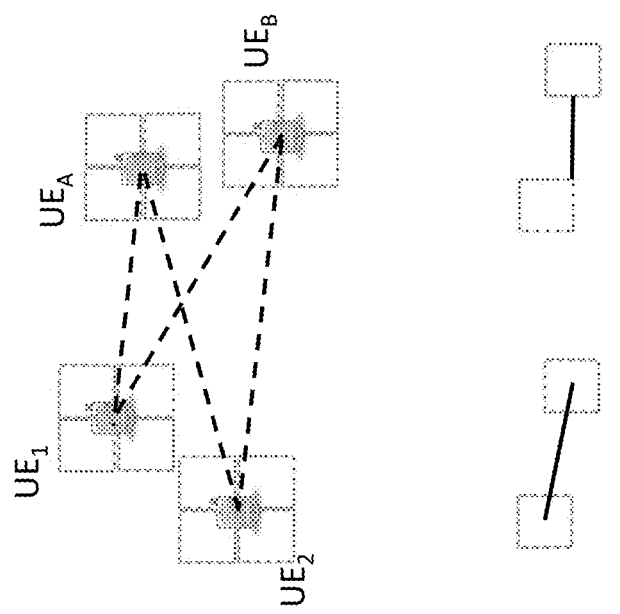
FIG. 9 provides a schematic illustration of various distances between devices, according to one embodiment of the present invention.

Some of the approaches for determining the distance between the relevant devices and the D2D devices can be explained via the illustration presented in FIG. 9. For the illustration of FIG. 9, consider that $UE_1$ and $UE_2$ would like to initiate a D2D communication and that $UE_A$ and $UE_B$ are potential victim or aggressor devices. As described above, the distance determination between particular devices depends on the accuracy of the available location information for each particular device. For example, if exact device coordinates are available, than the distance parameter could be calculated as the distance between the two devices based on the geometrical distance between the device locations as defined by their coordinates. This is illustrated in FIG. 9 with the dashed lines between the devices $UE_1$ and $UE_2$ and the devices $UE_A$ and $UE_B$. In another example, the device locations could be available in an approximate manner by defining an approximate area where each individual device is located. For example, this area and its size can be defined by a particular set of pixels, as is illustrated in FIG. 9 with four square pixels identified with dashed lines around each device shown in FIG. 9. While FIG. 9 illustrates four square pixels per device, such an illustration is chosen for clarity reasons, and in other embodiments, there could be a different number of pixel areas defining the approximate location and pixel areas could be of any other shape besides the square pixels. In such an example, the distance parameter between two particular devices could be determined e.g. as the minimal distance between any pixel pair from the pixel set of the individual UEs. For example, as illustrated on the bottom part in FIG. 9 with solid lines, the distance between two pixels can be determined e.g. based on the coordinates of the pixel centers (the bottom-left illustration in FIG. 9) or based on the shortest distance between the edges of the pixel area (the bottom-right illustration in FIG. 9).

In general for the UEs presented in FIG. 9 and regardless of whether the exact or the approximate coordinates are known, the following distances between the devices can be identified: $[UE_1, UE_A]$, $[UE_1, UE_B]$, $[UE_2, UE_A]$ and $[UE_2, UE_B]$. In such a case, based on the available distances, the determination of the distance parameter D indicative of the overall distance among the pair ($UE_1$, $UE_2$) and pair ($UE_A$, $UE_B$) can be determined in one of the following manners:

1) D=min {[$UE_1$, $UE_A$], [$UE_1$, $UE_B$], [$UE_2$, $UE_A$], [$UE_2$, $UE_B$]} i.e. the distance parameter is equal to the minimum distance between the first and second D2D devices that are about to initiate the D2D communication and the possible victim/aggressor devices, 2) D is a minimum of a subset of distances between the pairs if a particular device is dominating the interference conditions by e.g. much higher activity than the other devices, higher transmission power than the other devices, etc. For example, if $UE_A$ is dominating the aggressor role and $UE_B$ is rarely active then D=min{[$UE_1$, $UE_A$], [$UE_2$, $UE_A$]} is the subset of distance that is considered for determination of the distance parameter. Another possibility for considering only a sub-set of the victim/aggressor devices is that some devices might be more susceptible to interference (e.g. because they have a higher sensitivity) or have high priority devices (e.g. either by subscription or type e.g. public safety UE, etc.), 3) D=avg {[$UE_1$, $UE_A$], [$UE_1$, $UE_B$], [$UE_2$, $UE_A$], [$UE_2$, $UE_B$]} i.e. the distance parameter is equal to the average distance between the D2D devices that are about to initiate the D2D communication and the possible victim/aggressor UEs, 4) If the distance between the pairs is significantly larger than the distance between the UEs forming a pair, an alternative is to first determine a point on the line between $UE_1$ and $UE_2$ and a point on the line between $UE_A$ and $UE_B$ and then determine the distance between these two points. The points may be in the middle between $UE_1$ and $UE_2$ and $UE_A$ and $UE_B$, but may also be closer to one of the two UEs e.g. in case this device is dominating the aggressor role, is of higher priority or is of higher sensitivity. The location on the line may then be determined by a weighted average of e.g. transmit power, sensitivity and/or priority.

In case the single potential victim/aggressor device is a single device (e.g., $UE_A$ in FIG. 9 and not a UE pair $UE_A$-$UE_B$), then the discussions provided above for FIG. 9 are applicable when only distances [$UE_1$, $UE_A$] and [$UE_2$, $UE_A$] are considered. For the sake of brevity, these discussions are not repeated.

The method may then proceed to step 808, where the processor allocates one or more radio resources for the D2D communication between the first D2D device and the second D2D device based on the distance parameters determined for the relevant devices.

In various embodiments, allocation of radio resources "based" on a distance parameter may take many different forms. Below, some examples of such distance-based allocation of radio resources are provided. Based on the present description, a skilled person could envision further examples, all of which are within the scope of the present invention.

In one example, the distance parameter could indicate that the distance indicated by the parameter is 'large' or 'safe' from the interference point of view, i.e. that the identified relevant device is at a distance where such a device would, either for sure or very likely, not be a victim or an aggressor device. In such an embodiment, the distance-based allocation algorithm that the processor is implementing could conclude that there are no limitations (e.g. in time and/or frequency) in allocating the radio resources between the first and the second D2D devices and this relevant device. In such a case, overlapping radio resources could be used.

In another example, the distance parameter could indicate that the distance is 'small' ('short) or 'unsafe' (e.g. zero or up to few meters) from interference point of view, i.e. that the identified relevant device is at a distance where it would, either for sure or very likely, be a victim and/or an aggressor device. In such an embodiment, the distance-based allocation algorithm could conclude that no overlap (e.g. in time and/or frequency) is possible in allocating the radio resources between the first and the second D2D devices and this relevant device.

In a third example, the distance parameter could indicate that the distance is 'medium' or 'potentially unsafe' from interference point of view, i.e. that the identified relevant device is at a distance where the relevant device is a potential victim and/or aggressor, but that the interference can be acceptable if e.g. the transmit power of the identified relevant terminal and/or of the first and/or second D2D devices would be correctly configured. In such an embodiment, the distance-based allocation algorithm could conclude that overlapping allocations (e.g. in time and/or frequency) are possible, e.g. provided the identified relevant device and/or the first and/or second D2D devices comply with limitations about their maximum transmission power.

When the distance parameter indicates that the distance is smaller than the 'safe' distance, overlapping radio resources should be avoided or minimized. The processor may then select for the D2D communication a different frequency or time slot.

As an alternative to using a different time slot, the processor could use the allocation process to reduce the transmit power for the first and/or second D2D device and/or the relevant devices. In an embodiment, subsequently, the new safe distances can be determined (in view of the new values of transmit power) and the distance parameter can be calculated and evaluated again.

In an embodiment, the criteria used to determine whether the distance parameter indicates that the distance can be considered 'large', 'medium', or 'small' (i.e. safe, potentially unsafe, unsafe) can be derived based on one or more of the following:

1) the frequency band used or to be used by the identified relevant device and that requested for the D2D communication between the first and second D2D devices,
2) the locations of the identified relevant device and the first and second D2D devices in terms of e.g. height or depth (if available), or in terms of whether any of these devices are indoors or outdoors,
3) the terrain configuration in the area between the identified relevant device and the first and second D2D devices in terms of e.g. natural obstacles (e.g. hills, valleys, trees, green fields, rivers, lakes, etc.) or man-made obstacles (e.g. buildings, houses, towers, tunnels, bridges, etc.),
4) the capabilities of the relevant device and/or the first and/or second D2D devices about tolerable interference levels and maximum transmit power, and
5) network's configuration or a standard specification for maximum transmit power.

In some embodiments, the criteria may be statically configured for a particular resource allocation function, e.g. distances which are to be considered as safe, potentially unsafe, and unsafe could be pre-calculated and stored, for different deployment scenarios (e.g. per transmit power level). One advantage of pre-configuration is that all, or a part, of calculations, e.g. the calculations that consume most of processing resources of the processor, could be done in advance. What is then left for real time processing is for the processor to look up the pre-stored threshold distance values, e.g. per transmit power level or per other characteristic of a particular deployment scenario, and to compare those to the distance indicated by the distance parameter calculated for a particular relevant device.

In other embodiments, the criteria may be dynamically determined based on information obtained from the relevant device and/or the first and/or second D2D devices.

FIGS. 10 and 11 illustrate further, optional, embodiments of how the allocation of resources in step 808 could be implemented. In various embodiments, the processor of a data processing system carrying out the method steps described herein could be configured to implement either one or both of the approaches shown in FIGS. 10 and 11, combined with the method steps illustrated in FIG. 8.

FIG. 10 provides a flow diagram of method steps for allocating radio resources for a D2D communication between a first D2D device and a second D2D device based on a victim interference parameter determined for each relevant device, according to one embodiment of the present invention.

In the embodiment shown in FIG. 10, the method of FIG. 8 could further include step 1002 where the processor would assess transmit power to be used by the first D2D device and/or the second D2D device for the D2D communication between these devices. The processor could then be configured to determine a victim interference parameter for each relevant device (shown as step 1004 in FIG. 10) using the determined distance parameter and the assessed D2D transmit power. Such a victim interference parameter would be indicative of an interference level at the relevant device attributable to the D2D communication between the first and second D2D devices. In step 1006, the processor would then determine whether the victim interference parameter for a particular relevant device under consideration satisfies a certain victim condition indicating that, potentially, this relevant device could be a victim of the D2D communication between the first and second D2D devices.

The steps shown in FIG. 10 could take place at any time with respect to the time when steps 802, 804, and 806 are implemented by the processor, as long as the steps of FIG. 10 take place before the step 808 of FIG. 8.

Based on the outcome of step 1006 for all of the relevant devices, the processor would carry out step 808 described above by allocating one or more radio resources for the D2D communication between the first and second D2D devices based on radio resources allocated to those of the relevant devices for which the victim interference parameter was determined to satisfy the victim condition. Such allocation could be further fine-tuned based on the actual values of the victim interference parameters for the different relevant devices.

The approach illustrated in FIG. 10 may allow allocating resources to a D2D communication so that the extent to which other devices may be victimized by the interference caused by the D2D communication between the first and second D2D devices is minimized. For example, radio resources may be allocated to a D2D communication in such a manner that, when the D2D communication takes place using the allocated resources, for each relevant device for which the victim interference parameter was determined to satisfy the victim condition, interference experienced by the device due to the D2D communication between the first and second D2D devices would satisfy a particular predetermined condition. In one embodiment, the condition could be e.g. that the interference experienced by such a relevant device is below a particular threshold.

In one further embodiment based on the use of the "victim interference parameter" as illustrated in FIG. 10, the step 808 of allocating the radio resources may further comprise the processor setting a transmit power level for the first D2D device and/or the second D2D device for the D2D communication between the first D2D device and the second D2D device. In this manner, if it is unavoidable that the D2D communication uses resources that overlap (in frequency and time) with resources used by some of the devices identified as relevant, the transmit power of the first and/or second D2D devices may be limited in order to limit the extent to which these relevant devices may be affected (victimized) by such communication.

FIG. 11 provides a flow diagram of method steps for allocating radio resources for a D2D communication between a first D2D device and a second D2D device based on an aggressor interference parameter determined for each relevant device, according to one embodiment of the present invention.

In the embodiment shown in FIG. 11, the method of FIG. 8, possibly in combination with the steps illustrated in FIG. 10, could further include steps 1102, 1104, and 1106 that the processor would perform for each device of the devices identified as relevant. In step 1102, the processor would assess transmit power used or to be used by each of the relevant devices. In step 1104, the processor would determine an aggressor interference parameter for the relevant device using the determined distance parameter and the assessed device transmit power. Such an aggressor interference parameter would be indicative of an interference level at the first D2D device and/or the second D2D device attributable to the relevant device under consideration. In step 1106, the processor would determine, for each of the relevant devices, whether the calculated aggressor interference parameter satisfies a certain aggressor condition indicating that, potentially, this relevant device could be an aggressor with respect to the D2D communication between the first and second D2D devices (i.e., that the first and/or second D2D devices could be victims to the radio communication of this relevant device).

The steps shown in FIG. 11 could take place at any time with respect to the time when steps 802, 804, and 806 are implemented by the processor, as long as the steps of FIG. 11 take place before the step 808 of FIG. 8.

Based on the outcome of step 1106 for all of the relevant devices, the processor would carry out step 808 described above by allocating one or more radio resources for the D2D communication between the first D2D device and the second D2D device based on radio resources allocated to the one or more devices for which the aggressor interference parameter was determined to satisfy the aggressor condition, Such allocation could be further fine-tuned based on the actual values of the aggressor interference parameters for the different relevant devices.

The approach illustrated in FIG. 11 may allow allocating resources to a D2D communication so that the extent to which a D2D communication may be negatively affected by radio communications of other devices is minimized. For example, resources may be allocated to a D2D communication so that, when the D2D communication takes place using the allocated resources, interference experienced by the first D2D device and/or the second D2D device due to radio communication(s) of other devices, especially due to the communication of the devices for which the aggressor interference parameter was determined to satisfy the aggressor condition, satisfies a particular predetermined condition. In one embodiment, the condition could be e.g. that the interference(s) experienced by the first D2D and/or the second D2D device is (are) below a particular threshold or respective thresholds.

In one further embodiment based on the use of the "aggressor interference parameter" as illustrated in FIG. 11, the step 808 of allocating the radio resources may further comprise the processor setting a transmit power level for at least one relevant device for which the aggressor interference parameter was determined to satisfy the aggressor condition. In this manner, if it is unavoidable that the D2D communication uses resources that overlap (in frequency and time) with resources used by some of the devices identified as relevant, the transmit power of such relevant devices may be limited in order to limit the extent to which the radio communications of these relevant devices affect (victimize) the D2D communication between the first and second devices.

Yet another embodiment of how the allocation of resources in step 808 could be implemented will now be described (not illustrated in FIGs). The processor of a data processing system carrying out the method steps described herein could be configured to implement this embodiment instead of or in addition to one or both of the approaches shown in FIGS. 10 and 11, combined with the method steps illustrated in FIG. 8.

According to such an embodiment, the processor could further be configured to assess one or more of transmit powers used by the devices in question, such as e.g. transmit power to be used by the first D2D device for the D2D communication between the first D2D device and the second D2D device, transmit power to be used by the second D2D device for the D2D communication, and transmit power used or to be used by each relevant device. Based on the assessed transmit power(s), the step 808 of allocating the radio resources could then further include the processor allocating the one or more radio resources for the D2D communication between the first D2D device and the second D2D device based on whether the determined distance parameter satisfies a condition based on the assessed transmit power(s).

For example, the processor could determine a set of transmit levels for devices involved in D2D communication. The different transmit levels may be important in order to, on the one hand, ensure that transmit levels are high enough to receive the transmissions at the other D2D devices, but, on the other hand, ensure that they are as low as possible in order to minimize interference. Analogous reasoning applies to transmit levels for non-D2D devices communicating with a base station. For each of the determined transmit levels, a distance that can be considered to be safe, potentially unsafe, or unsafe can be established. To that end, criteria 1)-4) described above for establishing whether the distance parameter is 'large', 'medium', or 'small' (i.e. safe, potentially unsafe, unsafe) can be used. Analogous considerations as those described above (step 808) with respect to the allocation of resources in terms of safe/potentially unsafe/unsafe distances are also applicable here and, in the interests of brevity, are not repeated.

In an embodiment, the transmit power levels could be used as input parameters for a propagation model that takes into consideration one or more of parameters 1)-3) described above for establishing whether the distance parameter is 'large', 'medium', or 'small'. Based on the propagation model, the transmit level, and a maximum acceptable interference level, a 'minimum safe distance' may be determined indicating a distance at which the interference from the D2D devices or other devices identified as relevant would drop below the maximum acceptable interference level. The distances identified by the calculated distance parameters could then be compared with the 'minimum safe distance'. If the processor determines that the distance indicated by the calculated distance parameter is greater than the 'minimum safe distance', overlapping radio resources can be used. Otherwise, the use of overlapping resources should be avoided or minimized.

Now, four exemplary deployment scenarios for implementing the methods disclosed herein are described.

I. First Scenario: All UEs are within Network Coverage

This scenario applies when devices $UE_1$ and $UE_2$ are about to establish a D2D communication and the potential victim/aggressor devices are within the network coverage, as illustrated in FIGS. 2 and 3 described above. In this scenario it is assumed that $UE_1$ and $UE_2$ have discovered each other and already issued a request for D2D communication towards their serving network (or eNB).

In such a scenario, it is the network that gathers location information of active UEs that could be potential victim/aggressor to the UE pair that is about to establish the D2D communication (steps 802 and 804), where, as used herein, an expression that a network is performing a particular method step is to be understood that a processor within e.g eNB or other node within the network is performing the step. The network may obtain location information for the relevant UEs either by the active UEs reporting their location information to the network (if applicable), or by the network itself having the capability of determining the required location information for the relevant active UEs.

The network can establish which UEs are to be considered as "relevant" based on the considerations described above.

The network may then determine the distance parameters for the UEs identified as relevant and, based on the values of these parameters, decide which of the identified potential victim/aggressor UEs should be considered for the resource allocation process and which UEs should be left out (i.e. deciding if the potential victim/aggressor UE is a real victim or aggressor).

In particular, the network can determine whether a particular relevant UE should be identified as an aggressor for $UE_1$ and $UE_2$ based on the transmit power levels that is currently used (or has been used in the past) by the potential aggressor UE. This transmit power level can be e.g. peak power or average power level within a certain time interval as used by the potential aggressor UE. The network can retrieve this information e.g. via uplink measurements or specific UE signaling reports.

Similarly, the network can determine whether a particular relevant UE should be identified as a victim of the D2D communication between $UE_1$ and $UE_2$ based on the transmit power levels that are to be used by one or both of these devices for their D2D communication. The network can obtain the potential transmit power levels for $UE_1$ and $UE_2$ e.g. from the radio resource management/power control algorithm in the eNB.

Based on the distance parameter and based on the determined transmit power level for the potential aggressor UE, the network can estimate what is the interference power level at $UE_1$ and $UE_2$ that are about to establish the D2D communication session. If the estimated interference power level is higher than a pre-defined threshold, then the particular UE may be identified as a real/true aggressor, while if the interference level is below the pre-defined threshold, then the UE may be considered as irrelevant (i.e. not a real/true aggressor).

Similarly, based on the distance parameter and based on the transmit power level to be used by the first and/or second D2D devices for their D2D communication, the network can estimate what is the interference power level at the relevant other UEs. If the estimated interference power level is higher than a pre-defined threshold, then the particular UE may be identified as a real/true victim, while if the interference level is below the pre-defined threshold, then the UE may be considered as irrelevant (i.e. not a real/true victim).

Based on the identified real/true victim and/or aggressor UEs, the network may then decide which and how many of the available resources can be utilized by the $UE_1$ and $UE_2$ for their requested D2D communication section as well as their maximum transmit power. For this purpose, the network is preferably aware about the used resources (in frequency and/or time) by the identified victim/aggressor UEs. The information about the resource usage may be assumed to be readily available to the network as the network allocates and control these resources at session set-up and during the sessions' lifetime.

The allocation of resources may then be done as follows. The $UE_1$ and $UE_2$ may be allocated to use radio resources that are non-overlapping (in frequency and/or time) with radio resources used or to be used by the potential victim and/or aggressor UEs, such that the mutual interference is completely avoided. If the network cannot find non-overlapping resources for $UE_1$ and $UE_2$ so that the mutual interference is completely avoided, the network may decide to use overlapping resources for $UE_1$ and $UE_2$ with other victim and or aggressor UE, but the allowed maximum transmission power for $UE_1$ and $UE_2$ and the identified aggressor UE for the overlapping resources is selected such that the caused mutual interference on the overlapping resources is acceptable.

II. Second Scenario: Some UEs are Outside of Network Coverage

This scenario applies when devices $UE_1$ and $UE_2$, within the network coverage, are about to establish a D2D communication and the potential victim/aggressor devices that are outside of the network coverage of eNB1 and not served by any of its neighbor eNBs, as illustrated in FIG. 4 described above. In such a scenario, the network as described in the first scenario cannot solve the interference issues from/to $UE_3$ and $UE_4$ because the eNB1 in this case cannot directly communicate with $UE_3$ and $UE_4$ (as they are outside its coverage area), collect or determine location information for $UE_3$ and $UE_4$, and signal the aligned resource usage (in frequency and/or time, including allowed maximum transmit power) to $UE_3$ and $UE_4$ so that the resources do not overlap or, in case that overlapping resource usage is unavoidable, cause acceptable mutual interference.

Therefore, the functionality of the network should be adapted (in comparison with the network described in the first scenario) as follows.

With respect to collecting relevant location information, one issue to resolve in this case is how to allow the network serving $UE_1$ and $UE_2$ to collect location information for $UE_3$ and $UE_4$ that are outside its coverage.

In one embodiment, the location of $UE_3$ and $UE_4$ could be made available to the network serving $UE_1$ and $UE_2$ via another network, which cover $UE_3$ and $UE_4$. For example, $UE_3$ and $UE_4$ are devices covered by another cellular network (e.g. GSM, UMTS, WiMAX etc.), WLAN network based on the IEEE 802.11 standards family, etc, or are covered by an LTE base station that operates in another band than that used for D2D communication by $UE_1$ and $UE_2$. All these other networks could have the capability to determine the UE locations and report the determined locations to the network serving $UE_1$ and $UE_2$. Alternatively, $UE_3$ and $UE_4$ may be reporting their location to the other network (e.g. cellular or WLAN) and this network may be configured to convey the reported location information to the network serving $UE_1$ and $UE_2$.

In another embodiment, the location of $UE_3$ and $UE_4$ could be made available to the network serving $UE_1$ and $UE_2$ via UEs located inside its coverage area. In other words, terminals within the network coverage (e.g. $UE_1$ and $UE_2$ or any other UE) that are reachable by $UE_3$ and $UE_4$ (i.e., UEs with which $UE_1$ and $UE_2$ could communicate) may be used as relays to convey the location information of $UE_3$ and $UE_4$ to the network serving $UE_1$ and $UE_2$. For example, $UE_3$ and $UE_4$ could be reporting their location such that other UEs that are within network coverage of eNB1 (e.g. $UE_1$ and $UE_2$ in FIG. 4) can convey that information to the network serving $UE_1$ and $UE_2$. In another example, $UE_1$ and $UE_2$ (or any other UE within the coverage of the network serving $UE_1$ and $UE_2$ and reachable by $UE_3$ and $UE_4$) may be configured to estimate the distance to the UEs outside the network coverage based on measurement of signals transmitted by the not-covered UEs. These signals can be e.g. known pilot and synchronization signals and with known transmit power, such that the receiving UE within the network coverage can determine the distance to the UE outside of the coverage and report the determined distance to its' serving network.

With respect to resource and transmit power allocation, one issue to be resolved in this case is that the network serving $UE_1$ and $UE_2$ is not aware of the resource usage (frequency and/or time) for the D2D communication session between $UE_3$ and $UE_4$ as they are outside of its coverage and their resources are not allocated by the network. The information of the resource usage and corresponding transmit power of $UE_3$ and $UE_4$ could be conveyed to the network serving $UE_1$ and $UE_2$ in a similar manner as conveying the location information of $UE_3$ and $UE_4$. For example, the resource usage of $UE_3$ and $UE_4$ for their D2D communication, as well as their transmit power usage, could be made available to the network serving $UE_1$ and $UE_2$ via another network, which covers $UE_3$ and $UE_4$ (e.g. GSM, UMTS, WiMAX, WLAN, LTE, etc.) In another example, the resource usage of $UE_3$ and $UE_4$ for their D2D communication, as well as their transmit power usage, could be made available to the network serving $UE_1$ and $UE_2$ via any terminal within the coverage of the network serving $UE_1$ and $UE_2$ that is reachable by $UE_3$ and $UE_4$. These terminals (e.g. $UE_1$ or $UE_2$ or any other UE within the coverage of the network serving $UE_1$ and $UE_2$) could be configured to scan the frequency and time resources and report the usage of these resources by $UE_3$ and $UE_4$, as well as an estimate of transmit power used by $UE_3$ and $UE_4$, to the network serving $UE_1$ and $UE_2$.

Another issue to be resolved in this case with respect to resource and transmit power allocation is that the network's decision about the allocated resources (in frequency and time) for the D2D communication session between $UE_1$ and $UE_2$ might, if feasible, be non-overlapping with the resources (in frequency and/or time) used by $UE_3$ and $UE_4$ or might use (partly) overlapping resources with $UE_3$ and $UE_4$ with adjustments needed for the maximum allowed transmit power by $UE_3$ and $UE_4$. In the latter case, the $UE_3$ and $UE_4$ should be signaled about their resource usage and corresponding transmit power using a similar approach as that explained above. For example, one option is that this information may be delivered to $UE_3$ and $UE_4$ via the other network or, alternatively, another option is that UEs within the coverage of the network serving $UE_1$ and $UE_2$ could be relaying the updated resource and transmit power assignments to $UE_3$ and $UE_4$.

III. Third Scenario: All UEs are Outside of Network Coverage but are Under Network Coordination This scenario applies when all UEs (i.e., not only the potentially relevant devices, but also the first and second D2D devices requesting the D2D communication) happen to be outside of network coverage of any eNB that provides coverage for the LTE frequency band that the UEs will be using for D2D communication, e.g. as shown in FIG. 5. In that case, there is no eNB that provides allocation of resources in the conventional way (i.e., the steps described for the first scenario).

In such a case, another node, referred to herein as a "network based D2D resource allocation function", could be established in the network (i.e., not an eNB) that can implement steps that are described in the first scenario, provided that there are other cellular/WLAN networks that can connect $UE_1$, $UE_2$, $UE_3$, $UE_4$, $UE_5$, and $UE_6$ to this network based D2D resource allocation function.

IV. Fourth Scenario: All UEs are Outside of Network Coverage and there is No Network Coordination This scenario applies when all UEs may be outside network coverage, as shown in FIG. 5, and there is no network entity that has an overview of the locations of active UEs and their resource usage in terms of radio resources (e.g. frequency and/or time) and transmit power (i.e. there is no node such as a network based D2D resource allocation function described above). Therefore for this scenario, UEs could be configured to collect the location information from potential surrounding victim/aggressor UEs and decide on the resource usage and the allowed maximum power with the same decision steps as described in the present disclosure.

For example, assuming that $UE_1$ and $UE_2$ illustrated in the left cluster in FIG. 5 are about to set-up a D2D connection session, one solution could be as follows.

In step 804, both $UE_1$ and $UE_2$ perform gathering of location information from the possible surrounding victim/aggressor UEs (i.e. step 802 of identifying relevant UEs is implied as all UEs from which $UE_1$ and $UE_2$ can gather location information are identified as relevant). The gathering of location information can be done either by each individual UE being configured to transmit its own location coordinates (if available) or by $UE_1$ and $UE_2$ performing measurements of signature signals, e.g. synchronization and pilot signals, and estimating the distance to the potential victim/aggressor UEs. After this location information is gathered, $UE_1$ and $UE_2$ could exchange this information among themselves, e.g. via a default signaling D2D channel, and then one of them proceeds with the rest of the method steps described herein.

In an embodiment, while gathering the location information, $UE_1$ and $UE_2$ could also be configured to scan the used resources (in frequency and/or time) by the possible victim/aggressor UEs in their surroundings to estimate their resource usage and corresponding transmit power. This information could then also be exchanged between $UE_1$ and $UE_2$ in their initial signaling phase.

As a part of or after step 808, if $UE_1$ and $UE_2$ can use non-overlapping resources (in frequency and/or time) with regard to the surrounding victim/aggressor UEs, then no signaling is needed towards these UEs. However, if $UE_1$ and $UE_2$ decide to allocate (partly) overlapping resources with one or more victim/surrounding UEs, including adjustments for the maximum allowed transmit power of these UEs, then some signaling may be required towards the victim/aggressor UEs. Alternatively, the victim/aggressor UEs might individually and autonomously decide to decrease their maximum transmit power if they detect, e.g. by doing their own measurements, that another UE pair has started using the same physical resources (e.g. frequency and/or time).

FIG. 12 shows a block diagram illustrating an exemplary data processing system 1200 that may be used in allocation of resources for a D2D communication between a first D2D device and a second D2D device, according to one embodiment of the present disclosure.

Data processing system 1200 may include at least one processor 1202 coupled to memory elements 1204 through a system bus 1210. As such, the data processing system may store program code within memory elements 1204. Further, processor 1202 may execute the program code accessed from memory elements 1204 via system bus 1210. In one aspect, data processing system 1200 may be implemented as a computer that is suitable for storing and/or executing program code. It should be appreciated, however, that system 1200 may be implemented in the form of any system including a processor and memory that is capable of performing the functions described within this specification.

Memory elements 1204 may include one or more physical memory devices such as, for example, local memory 1206 and one or more bulk storage devices 1208. Local memory may refer to random access memory or other non-persistent memory device(s) generally used during actual execution of the program code. A bulk storage device may be implemented as a hard drive or other persistent data storage device. The processing system 1200 may also include one or more cache memories (not shown) that provide temporary storage of at least some program code in order to reduce the number of times program code must be retrieved from bulk storage device 1208 during execution.

Input/output (I/O) devices depicted as input device 1212 and output device 1214 optionally can be coupled to the data processing system. Examples of input device may include, but are not limited to, for example, a keyboard, a pointing device such as a mouse, or the like. Examples of output device may include, but are not limited to, for example, a monitor or display, speakers, or the like. Input device and/or output device may be coupled to data processing system either directly or through intervening I/O controllers. A network adapter 1216 may also be coupled to data processing system to enable it to become coupled to other systems, computer systems, remote network devices, and/or remote storage devices through intervening private or public networks. The network adapter may, in particular, comprise a data receiver 1218 for receiving data that is transmitted by said systems, devices and/or networks to said data and a data transmitter 1220 for transmitting data to said systems, devices and/or networks. Modems, cable modems, and Ethernet cards are examples of different types of network adapter that may be used with data processing system 1200.

The memory elements 1204 may store an application (not shown). It should be appreciated that data processing system 1200 may further execute an operating system (not shown) that can facilitate execution of the application. The application, being implemented in the form of executable program code, can be executed by data processing system 1200, e.g., by processor 1202. Responsive to executing the application, data processing system 1200 may be configured to perform one or more method steps described herein.

Persons skilled in the art will recognize that while the elements 1202-1222 are shown in FIG. 12 as separate elements, in other embodiments their functionality could be implemented in lesser number of individual elements or distributed over a larger number of components.

The four exemplary scenarios described above illustrate that the data processing system 1200 configured to perform the method steps described in the present disclosure could be implemented in various nodes. For example, for the first and second scenario, the data processing system 1200 could be implemented in some node of the network serving UE$_1$ and UE$_2$, such as e.g. in eNB. For the third scenario, the data processing system 1200 could be implemented in another node (not eNB) that would act as a network based D2D resource allocation function. For the fourth scenario, the data processing system 1200 could be implemented within each, or at least some, of the UEs themselves.

Various embodiments of the invention may be implemented as a program product for use with a computer system or a processor, where the program(s) of the program product define functions of the embodiments (including the methods described herein). In one embodiment, the program(s) can be contained on a variety of non-transitory computer-readable storage media (generally referred to as "storage"), where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 1202 described herein.

It is to be understood that any feature described in relation to any one embodiment may be used alone, or in combination with other features described, and may also be used in combination with one or more features of any other of the embodiments, or any combination of any other of the embodiments. Moreover, the invention is not limited to the embodiments described above, which may be varied within the scope of the accompanying claims.

The terminology used herein is for the purpose of describing particular embodiments only and is not intended to be limiting of the invention. As used herein, the singular forms "a," "an," and the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A computer-implemented method for allocating radio resources for a device-to-device (D2D) communication between a first D2D device and a second D2D device:

identifying one or more devices relevant for the D2D communication between the first D2D device and the second D2D device;

for each device of the identified devices, obtaining location information for the device;

for each device of the identified devices, using the location information obtained for the device and one or both of location information for the first D2D device and location information for the second D2D device, determining a distance parameter indicative of a distance between one of the device, a device pair comprising the device and a further entity or a further device with which the device is in communication, or a group of further devices comprising the device and a plurality of further entities or further devices with which the relevant device is in communication, and one of the first D2D device, the second D2D device, or a device pair comprising the first D2D device and the second D2D device;

allocating one or more radio resources for the D2D communication between the first D2D device and the second D2D device based on the determined distance parameter;

assessing a D2D transmit power to be used by at least one of the first D2D device or the second D2D device for the D2D communication between the first D2D device and the second D2D device; and for each device of the identified devices:

determining a victim interference parameter using the determined distance parameter and the assessed D2D transmit power, the victim interference parameter being indicative of an interference level at the device attributable to the D2D communication between the first D2D device and the second D2D device, and determining whether the victim interference parameter satisfies a victim condition, wherein the allocating comprises allocating one or more radio resources for the D2D communication between the first D2D device and the second D2D device based on radio resources allocated to the one or more devices for which the victim interference parameter was determined to satisfy the victim condition.

2. The computer-implemented method according to claim 1, wherein allocating the one or more radio resources for the D2D communication between the first D2D device and the second D2D device is further based on the victim interference parameter.

3. The computer-implemented method according to claim 1, wherein the allocating further comprises setting a transmit power level for at least one of the first D2D device or the second D2D device.

4. The computer-implemented method according to claim 1, further comprising, for each device of the identified devices:

assessing a device transmit power used or to be used by the device, determining an aggressor interference parameter using the determined distance parameter and the assessed device transmit power, the aggressor interference parameter being indicative of an interference level at at least one of the first D2D device or the second D2D device attributable to the device, and determining whether the aggressor interference parameter satisfies an aggressor condition, wherein the allocating comprises allocating one or more radio resources for the D2D communication between the first D2D device and the second D2D device based on radio resources allocated to the one or more devices for which the aggressor interference parameter was determined to satisfy the aggressor condition, and further based on the aggressor interference parameter.

5. The computer-implemented method according to claim 4, wherein the allocating comprises setting a transmit power level for at least one device for which the aggressor interference parameter was determined to satisfy the aggressor condition.

6. The computer-implemented method according to claim 1, further comprising:

assessing one or more of:
  D2D transmit power to be used by the first D2D device for the D2D communication between the first D2D device and the second D2D device,
  D2D transmit power to be used by the second D2D device for the D2D communication between the first D2D device and the second D2D device, and
  transmit power used or to be used by each device of the identified devices; and allocating the one or more radio resources for the D2D communication between the first D2D device and the second D2D device based on whether the determined distance parameter satisfies a condition based on the assessed one or more transmit powers.

7. The computer-implemented method according to claim 1, wherein the device is identified as relevant for the D2D communication between the first D2D device and the second D2D device when at least one of:
  (i) the device is served by a cell that is the same as, overlapping with, neighboring to, or within a certain distance from a cell serving at least one of the first D2D device or a cell serving the second D2D device,
  (ii) the device uses or is configured to use the same type of a radio resource as the one requested for the D2D communication between the first D2D device and the second D2D device,
  (iii) the device uses or is configured to use frequencies within a frequency band at least partially overlapping with a frequency band requested for the D2D communication between the first D2D device and the second D2D device, or
  (iv) the device uses or is configured to use radio resources within a time period at least partially overlapping with the time period for which the D2D communication between the first D2D device and the second D2D device is requested.

8. The computer-implemented method according to claim 1, wherein the location information for the device indicates a point representative of a location of the device, and wherein the distance parameter for the device is determined as:
  i) a minimum or as a weighted average of:
    a geometrical distance between the point representative of the location of the device and a point representative of a location of the first D2D device, and
    a geometrical distance between the point representative of the location of the device and a point representative of a location of the second D2D device; or
  ii) when the device is in communication with a further node, the minimum or as a weighted average of:
    a geometrical distance between the point representative of the location of the device and a point representative of a location of the first D2D device, and
    a geometrical distance between the point representative of the location of the device and a point representative of a location of the second D2D device;
    a geometrical distance between the point representative of the location of the further node and a point representative of a location of the first D2D device, and
    a geometrical distance between the point representative of the location of the further node and a point representative of a location of the second D2D device; or
  iii) when the device is in communication with the further node, a distance between a point on a line between the device and the further node and a point on a line between the first D2D device and the second D2D device, wherein at least one of:
    a location of the point on the line between the device and the further node is predefined or determined based on transmit power of at least one of the device or the further node, sensitivity of at least one of the device or the further node, or priority of the communication between the device and the further node, or
    a location of the point on the line between the first D2D device and the second D2D device is predefined or determined based on transmit power of at least one of the first D2D device or the second D2D device, sensitivity of at least one of the first D2D device or the second D2D device, or priority of the D2D communication between the first D2D device and the second D2D device.

9. The computer-implemented method according to claim 1, further comprising, when the one or more radio resources allocated for the D2D communication between the first D2D device and the second D2D device overlap, in at least one of frequency or time, with radio resources used by at least one device of the identified devices, at least one of:
  (i) providing an indication regarding the overlap to the at least one device with an indication of a power transmit level that the at least one device should apply; or
  (ii) providing an indication regarding the overlap to at least one of the first D2D device or the second D2D device with an indication of a power transmit level that the first D2D device should apply and an indication of a power transmit level that the second D2D device should apply.

10. A computer program product, stored on a computer-readable non-transitory storage medium, comprising software code portions, which when executed in a computer, cause the computer to:
  identify one or more devices relevant for a device-to-device (D2D) communication between a first D2D device and a second D2D device;
  for each device of the identified devices, obtain location information for the device;

for each device of the identified devices, using the location information obtained for the device and one or both of location information for the first D2D device and location information for the second D2D device, determine a distance parameter indicative of a distance between one of the device, a device pair comprising the device and a further entity or a further device with which the device is in communication, or a group of further devices comprising the device and a plurality of further entities or further devices with which the relevant device is in communication, and one of the first D2D device, the second D2D device, or a device pair comprising the first D2D device and the second D2D device;

allocate one or more radio resources for the D2D communication between the first D2D device and the second D2D device based on the determined distance parameter;

assess a D2D transmit power to be used by at least one of the first D2D device or the second D2D device for the D2D communication between the first D2D device and the second D2D device; and for each device of the identified devices:
determine a victim interference parameter using the determined distance parameter and the assessed D2D transmit power, the victim interference parameter being indicative of an interference level at the device attributable to the D2D communication between the first D2D device and the second D2D device, and
determine whether the victim interference parameter satisfies a victim condition, wherein, to allocate the one or more radio resources, the software code portions when executed in the computer further cause the computer to allocate the one or more radio resources for the D2D communication between the first D2D device and the second D2D device based on radio resources allocated to the one or more devices for which the victim interference parameter was determined to satisfy the victim condition.

11. A node comprising at least a processor, including hardware, configured to:
identify one or more devices relevant for a device-to-device (D2D) communication between a first D2D device and a second D2D device;
for each device of the identified devices, obtain location information for the device;
for each device of the identified devices, using the location information obtained for the device and one or both of location information for the first D2D device and location information for the second D2D device, determine a distance parameter indicative of a distance between one of the device, a device pair comprising the device and a further entity or a further device with which the device is in communication, or a group of further devices comprising the device and a plurality of further entities or further devices with which the relevant device is in communication, and one of the first D2D device, the second D2D device, or a device pair comprising the first D2D device and the second D2D device;

allocate one or more radio resources for the D2D communication between the first D2D device and the second D2D device based on the determined distance parameter;

assess a D2D transmit power to be used by at least one of the first D2D device or the second D2D device for the D2D communication between the first D2D device and the second D2D device; and for each device of the identified devices:
determine a victim interference parameter using the determined distance parameter and the assessed D2D transmit power, the victim interference parameter being indicative of an interference level at the device attributable to the D2D communication between the first D2D device and the second D2D device, and
determine whether the victim interference parameter satisfies a victim condition, wherein, to allocate the one or more radio resources, the processor is further configured to allocate the one or more radio resources for the D2D communication between the first D2D device and the second D2D device based on radio resources allocated to the one or more devices for which the victim interference parameter was determined to satisfy the victim condition.

12. The node according to claim 11, wherein the node is an evolved nodeB (eNB) or another node in a telecommunications network serving the first D2D device and the second D2D device, wherein the node is configured to obtain the location information of each device of the identified devices by receiving the location information as reported by the device or by determining the location information for the device.

13. The node according to claim 12, wherein, to receive the location information as reported by the device, the node is configured to at least one of:
(i) receive the location information as reported by the device to a further telecommunications network, the further telecommunications network being configured to operate using radio technology different than that used for the D2D communication between the first D2D device and the second D2D device,
(ii) receive the location information as reported by the device to a further eNB within the telecommunications network, the further eNB configured to operate in a different frequency band than that used for the D2D communication between the first D2D device and the second D2D device, or
(iii) receive the location information as reported by the device located outside of the coverage of the telecommunications network or the further telecommunications network to a device located inside the coverage of the telecommunications network or the further telecommunications network.

14. The node according to claim 11, wherein the node is the first D2D device.

15. The node according to claim 14, wherein the node is further configured to transmit the location information for the node, and wherein the node is further configured to scan, in at least one of frequency or time, radio resources used by the one or more of the identified devices.

16. The node according to claim 11, wherein the processor is configured to allocate the one or more radio resources for the D2D communication between the first D2D device and the second D2D device further based on the victim interference parameter.

17. The node according to claim 11, wherein, to allocate the one or more radio resources, the processor is further configured to set a transmit power level for at least one of the first D2D device or the second D2D device.

18. The node according to claim 11, wherein the processor is further configured to, for each device of the identified devices:

assess a device transmit power used or to be used by the device, determine an aggressor interference parameter using the determined distance parameter and the assessed device transmit power, the aggressor interference parameter being indicative of an interference level at at least one of the first D2D device or the second D2D device attributable to the device, and determine whether the aggressor interference parameter satisfies an aggressor condition, wherein, to allocate the one or more radio resources, the processor is configured to allocate the one or more radio resources for the D2D communication between the first D2D device and the second D2D device based on radio resources allocated to the one or more devices for which the aggressor interference parameter was determined to satisfy the aggressor condition, and further based on the aggressor interference parameter.

19. The node according to claim 18, wherein, to allocate the one or more radio resources, the processor is configured to set a transmit power level for at least one device for which the aggressor interference parameter was determined to satisfy the aggressor condition.

20. The node according to claim 11, wherein the processor is further configured to:

assess one or more of: (i) D2D transmit power to be used by the first D2D device for the D2D communication between the first D2D device and the second D2D device, (ii) D2D transmit power to be used by the second D2D device for the D2D communication between the first D2D device and the second D2D device, and (iii) transmit power used or to be used by each device of the identified devices; and allocate the one or more radio resources for the D2D communication between the first D2D device and the second D2D device based on whether the determined distance parameter satisfies a condition based on the assessed one or more transmit powers.

21. The node according to claim 11, wherein the processor is configured to identify the device as relevant for the D2D communication between the first D2D device and the second D2D device when at least one of:
(i) the device is served by a cell that is the same as, overlapping with, neighboring to, or within a certain distance from a cell serving at least one of the first D2D device or a cell serving the second D2D device,
(ii) the device uses or is configured to use the same type of a radio resource as the one requested for the D2D communication between the first D2D device and the second D2D device,
(iii) the device uses or is configured to use frequencies within a frequency band at least partially overlapping with a frequency band requested for the D2D communication between the first D2D device and the second D2D device, or
(iv) the device uses or is configured to use radio resources within a time period at least partially overlapping with the time period for which the D2D communication between the first D2D device and the second D2D device is requested.

22. The node according to claim 11, wherein the location information for the device indicates a point representative of a location of the device, and wherein the distance parameter for the device is determined as:
iv) a minimum or as a weighted average of:
a geometrical distance between the point representative of the location of the device and a point representative of a location of the first D2D device, and
a geometrical distance between the point representative of the location of the device and a point representative of a location of the second D2D device; or
v) when the device is in communication with a further node, the minimum or as a weighted average of:
a geometrical distance between the point representative of the location of the device and a point representative of a location of the first D2D device, and
a geometrical distance between the point representative of the location of the device and a point representative of a location of the second D2D device;
a geometrical distance between the point representative of the location of the further node and a point representative of a location of the first D2D device, and
a geometrical distance between the point representative of the location of the further node and a point representative of a location of the second D2D device; or
vi) when the device is in communication with the further node, a distance between a point on a line between the device and the further node and a point on a line between the first D2D device and the second D2D device, wherein at least one of:
a location of the point on the line between the device and the further node is predefined or determined based on transmit power of at least one of the device or the further node, sensitivity of at least one of the device or the further node, or priority of the communication between the device and the further node, or
a location of the point on the line between the first D2D device and the second D2D device is predefined or determined based on transmit power of at least one of the first D2D device or the second D2D device, sensitivity of at least one of the first D2D device or the second D2D device, or priority of the D2D communication between the first D2D device and the second D2D device.

23. The node according to claim 11, wherein the processor is further configured to, when the one or more radio resources allocated for the D2D communication between the first D2D device and the second D2D device overlap, in at least one of frequency or time, with radio resources used by at least one device of the identified devices, at least one of:
(i) provide an indication regarding the overlap to the at least one device with an indication of a power transmit level that the at least one device should apply; or
(ii) provide an indication regarding the overlap to at least one of the first D2D device or the second D2D device with an indication of a power transmit level that the first D2D device should apply and an indication of a power transmit level that the second D2D device should apply.

* * * * *